United States Patent [19]

Inatome

[11] Patent Number: 6,048,066

[45] Date of Patent: Apr. 11, 2000

[54] FILM PROCESSING APPARATUS AND FILM PROCESSING METHOD

[75] Inventor: Kiyoshi Inatome, Kanagawa, Japan

[73] Assignee: Sony Corporation, Tokyo, Japan

[21] Appl. No.: 09/104,064

[22] Filed: Jun. 24, 1998

[30] Foreign Application Priority Data

Jun. 26, 1997 [JP] Japan ............................... P09-169862

[51] Int. Cl.$^7$ .............................. G03B 21/46; G03B 1/00
[52] U.S. Cl. .......................................... 352/160; 352/166
[58] Field of Search .................................. 352/161, 162, 352/163, 164, 165, 166, 160, 184, 187, 92, 105–120, 236; 348/96, 97, 105, 112

[56] References Cited

U.S. PATENT DOCUMENTS

| | | | |
|---|---|---|---|
| 3,622,235 | 11/1971 | Yamada | 352/92 |
| 4,524,392 | 6/1985 | Poetsch . | |
| 5,082,357 | 1/1992 | Haas et al. | 352/160 |
| 5,608,474 | 3/1997 | Fujiwara et al. | 352/160 |
| 5,710,616 | 1/1998 | Saito et al. | 352/92 |
| 5,870,171 | 2/1999 | Baumann et al. | 352/160 |
| 5,886,772 | 3/1999 | Inatome et al. | 352/225 |
| 5,923,401 | 7/1999 | Inatome . | |
| 5,949,087 | 9/1999 | Cooper . | |

FOREIGN PATENT DOCUMENTS

| | | |
|---|---|---|
| 2 371 701 | 6/1978 | France . |
| 58-152233 | 9/1983 | Japan ............................... G03B 21/32 |
| 04081741 | 3/1992 | Japan ............................... G03B 21/46 |

Primary Examiner—Alan A. Mathews
Assistant Examiner—Rodney Fuller
Attorney, Agent, or Firm—Philip M. Shaw; Crosby, Heafey, Roach & May

[57] ABSTRACT

A movie film image projecting device wherein a movie film is intermittently stopped in a manner synchronized with rotation of a sprocket by means of travel-synchronizing holes which have been formed longitudinally with respect to the movie film and a light from a light source is projected on a stated region of the movie film at a stopped base position. Detectors for detecting at a plurality of locations the displacement of the film from the base position at the time the movie film has stopped, on the basis of the travel-synchronizing holes, output a different position detection signal corresponding to the deviation of the film from the base position at each of the plurality of locations. An abnormality judging circuit supplied with the position detection signals determines whether or not the position detection signals are abnormal and outputs an abnormality detection signal for each of the position detection signals which is determined to be abnormal. An optical axis correcting unit supplied with the position detection signals and the abnormality detection signals then corrects the optical axis of light transmitted through the movie film on the basis of the position detection signals which are judged by the abnormality judging means to be not abnormal.

16 Claims, 12 Drawing Sheets

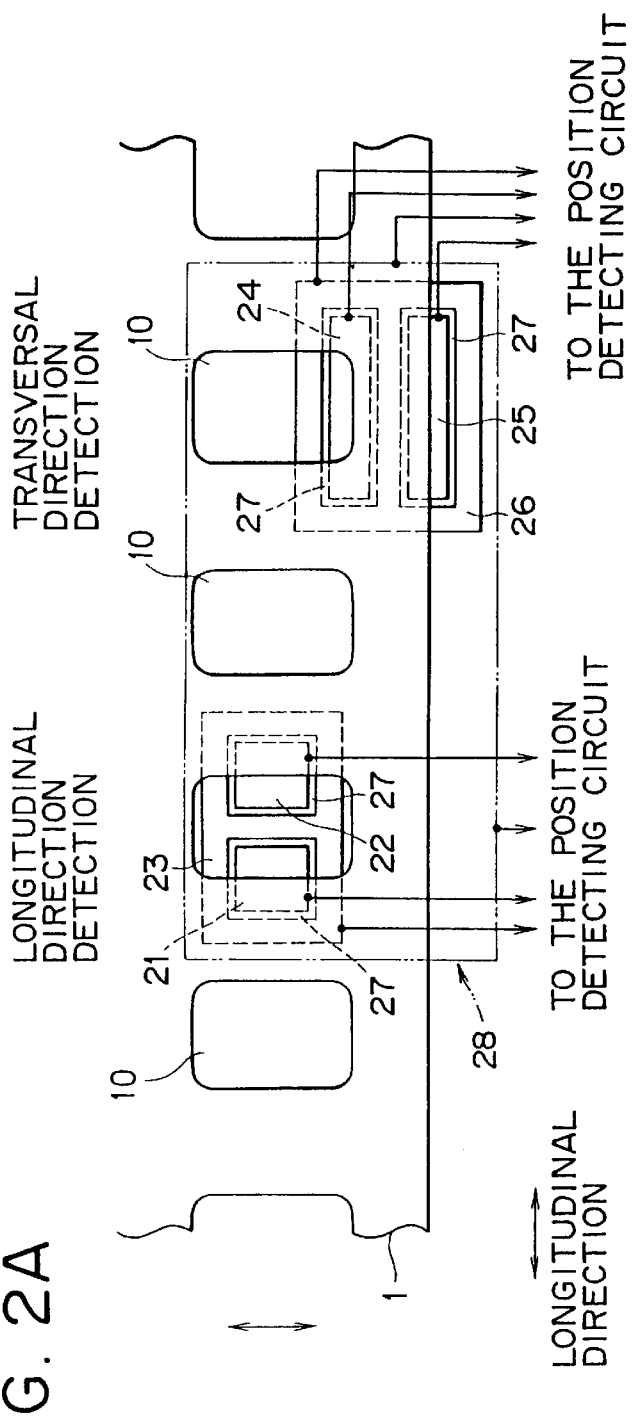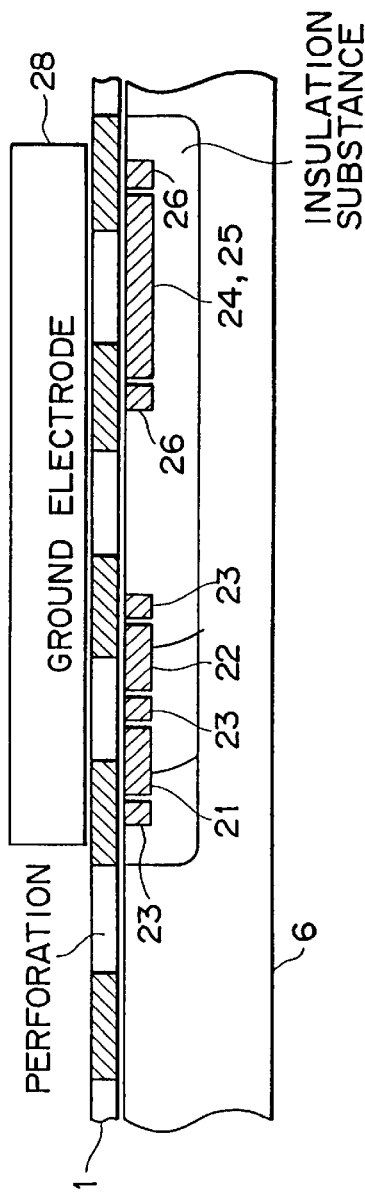
FIG. 2A
FIG. 2B

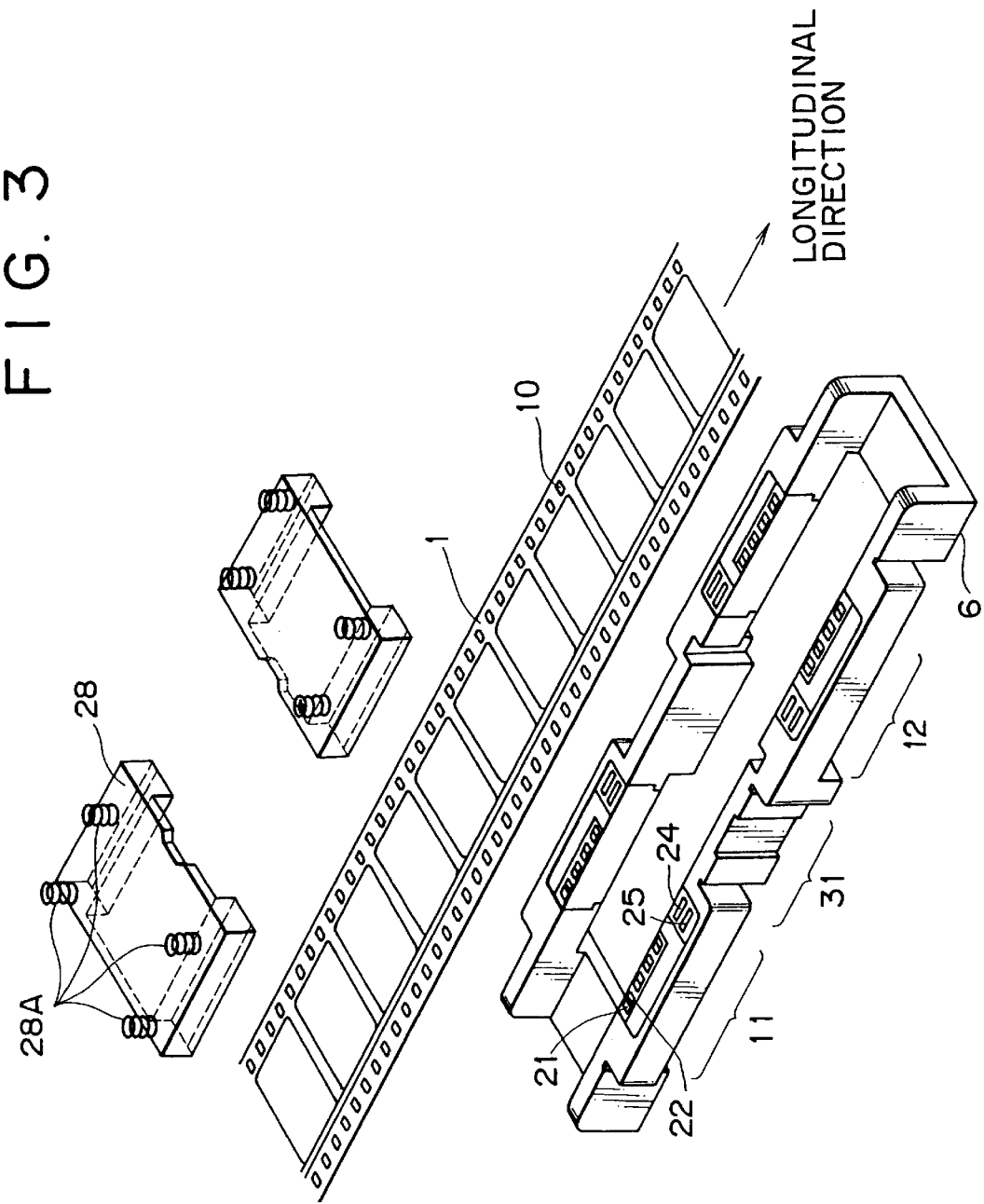

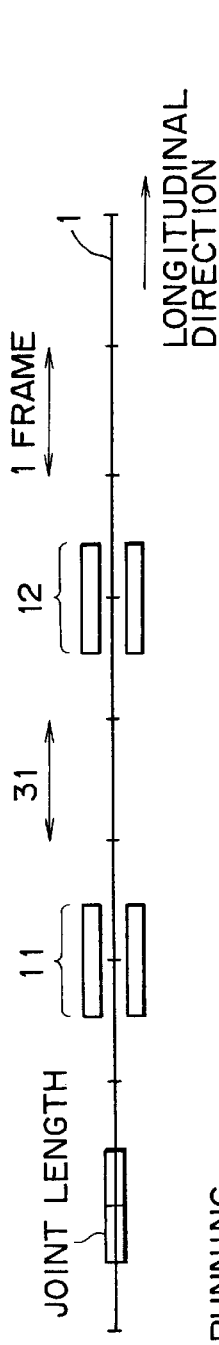

FIG. 9B
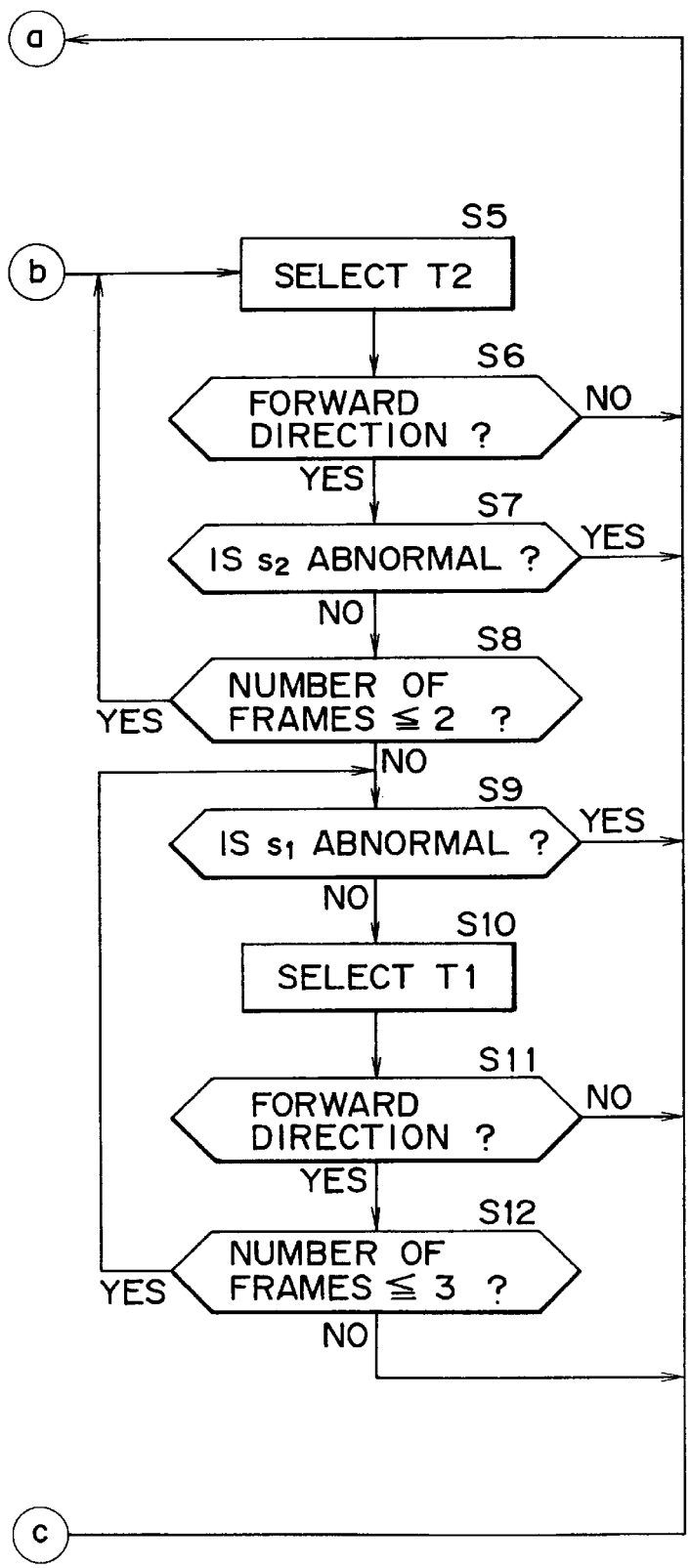
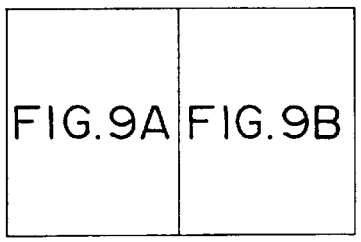

FILM PROCESSING APPARATUS AND FILM PROCESSING METHOD

BACKGROUND OF INVENTION

1. Field of the Invention

In general, the present invention relates to a film processing apparatus and a film processing method. More particularly, the present invention relates to a film processing apparatus and a film processing method which are capable of always correcting blurring of an image with a high degree of accuracy, for example, in an operation to reproduce an image from a cinematographic film or an operation to record an image into a cinematographic film.

2. Description of Related Art

A continuous feeding method or an intermittent feeding method is typically adopted as a method for running a cinematographic film in a film processing apparatus such as a film recording apparatus for recording images into a cinematographic film, a projector for projecting images recorded on a cinematographic film or a telecinematographic apparatus for converting an image recorded on a cinematographic film into a television signal.

With the continuous feeding method, the cinematographic film is run at a constant speed by means of a capstan. A light repeating a one dimensional operation is applied to the cinematographic film in a direction perpendicular to the running direction of the film. With the intermittent feeding method, on the other hand, the cinematographic film is run intermittently by moving the film by one frame at one time using perforations, that is, rectangular sprocket holes bored on the film and arranged along lines in the longitudinal direction of the film. The perforations are engaged with registration pins which are driven by a cam mechanism to run the cinematographic film intermittently.

In the case of the continuous feeding method, even though the magnitude of a load applied to the cinematographic film is small, it is necessary to synchronize the running of an illuminating light with the running of the film. If the running of the illuminating light is not synchronized perfectly with the running of the cinematographic film, jitters and/or flickers in the displayed image are generated in the longitudinal direction of the film in some cases.

In the case of the intermittent feeding method, on the other hand, while the number of jitters or flickers can be reduced to a small value in comparison with the continuous feeding method, it is necessary to intermittently halt the cinematographic film at a predetermined position. If the cinematographic film is not halted at the predetermined position, the image projected on the screen blurs, deteriorating the picture quality of the image. As a result, the watcher feels a sense of incompatibility.

In order to solve the problems described above, a sensor for detecting the position of the cinematographic film is provided. A signal output by the sensor is used for correcting the blurring of the image.

In many cases, however, a typical complete cinematographic film comprises a plurality of partial cinematographic films concatenated with each other. As a technique of joining a partial cinematographic film to another, there are provided, among other methods, a technique of sticking splicing tapes on both sides of the ends of two cinematographic films to produce a butt joint as shown in FIG. 11(A) and a technique of cutting notches at the ends of each partial cinematographic film engaging the notches and with each other to form a lap joint as shown in FIG. 11(B).

In the case of a complete cinematographic film comprising a plurality of partial cinematographic films joined with each other like the one described above, the joint portion consequently has a thickness and other physical properties different from the rest. It is thus difficult to correctly detect the position of the joint portion of the cinematographic film by using the film position sensor. In such a case, the amount of image blurring is adversely increased in some cases in an attempt to compensate for the image blurring based on a signal output by the sensor.

Addressing the problems described above, the present invention allows image blurring to be always compensated for with a high degree of accuracy.

SUMMARY OF THE INVENTION

A film processing apparatus according to one embodiment of the invention comprises a plurality of film position detecting means provided at different locations for detecting the position of a film.

A film processing method according to another embodiment of the invention is characterized in that the method is used for correcting the position of a film on the basis of one or more signals output by a plurality of film position detecting means provided at different locations for detecting the position of a film.

More specifically, a film processing apparatus for processing a film according to the invention comprises a plurality of film position detectors provided at different locations, each detector detecting the position of the film relative to a predetermined position and outputting a separate position detection signal, an abnormality determining circuit supplied with the position detection signals which determines whether or not the position detection signals are abnormal and outputs an abnormality detection signal for each of the position detection signals determined to be abnormal, and a positional shift corrector supplied with the position detection signals and the abnormality detection signals which corrects positional shifts of the film on the basis of the position detection signals which are judged by the abnormality determining circuit to be not abnormal. In the preferred embodiment the positional shift corrector optically corrects for the positional shift of the film.

The preferred embodiment also includes a film guide for guiding the film and an opening for passing through a light is created on the film guide. The film position detectors are provided on the film guide at locations sufficiently spaced apart from each other that any joint existing in the film does not become an object of simultaneous positional detection by all the film position detectors. Preferably, the film position detectors are provided at least on the upstream and downstream sides of a traveling path of the film with respect to the opening created on the film guide.

A film processing method according to the invention for processing a film comprises the steps of detecting, at different locations, the position of the film relative to a predetermined position and outputting position detection signals corresponding to each location, determining whether or not the position detection signals are abnormal and outputting an abnormality detection signal for each of the position detection signals which is determined to be abnormal, and correcting for a positional shift of the film on the basis of the position detection signals which are judged by the abnormality determining step to be not abnormal. The step of correcting for a positional shift of the film preferably comprises the step of correcting the optical axis-of light transmitted through the film.

When all the position detection signals are judged by the abnormality determining step to be abnormal, the positional shift correcting step corrects a positional shift of the film on the basis of the results of position detection signals output by the film position detecting step which have been used in an immediately previous correction. The film position detecting steps are simultaneously performed at locations spaced apart along the length of the film so that any joint existing on the film does not become an object of simultaneous positional detection by all of the film position detecting steps.

The film processing method according to the invention further comprises the steps of guiding the film over an opening for passing through a light, and performing the film position detecting step adjacent to the opening. The film position detecting step is performed at least on the upstream and downstream sides of a traveling path of the film with respect to the opening.

The foregoing and other objectives, features and advantages of the invention will be more readily understood upon consideration of the following detailed description of certain preferred embodiments of the invention, taken in conjunction with the accompanying drawings.

BRIEF DESCRIPTION OF DRAWINGS

A preferred embodiment of the present invention has been described by referring to the following diagrams wherein:

FIGS. 2(A) and 2(B) are diagrams showing a typical configuration of a sensor 11 or 12 employed in the telecinematographic apparatus shown in FIG. 1, wherein FIG. 2(A) is a plane diagram, with portions broken away, showing the sensor 11 as viewed from the side of the CCD camera 9 (with the moving side gate 7 removed) while FIG. 2(B) is a diagram showing a cross section of the sensor 11, with portions broken away;

FIG. 3 is an exploded, perspective view of a fixed side picture gate 6 employed in the telecinematographic apparatus shown in FIG. 1;

FIGS. 8(A) to 8(G) are diagrams used for explaining the operation of the film position detecting circuit 13 shown in FIG. 5;

DESCRIPTION OF PREFERRED EMBODIMENTS

It should be noted, however, that the description given hereinafter is, of course, not intended to be construed in a limiting sense. That is to say, the means described in the claims are not limited to the above typical implementations now to be described.

Figure 1:
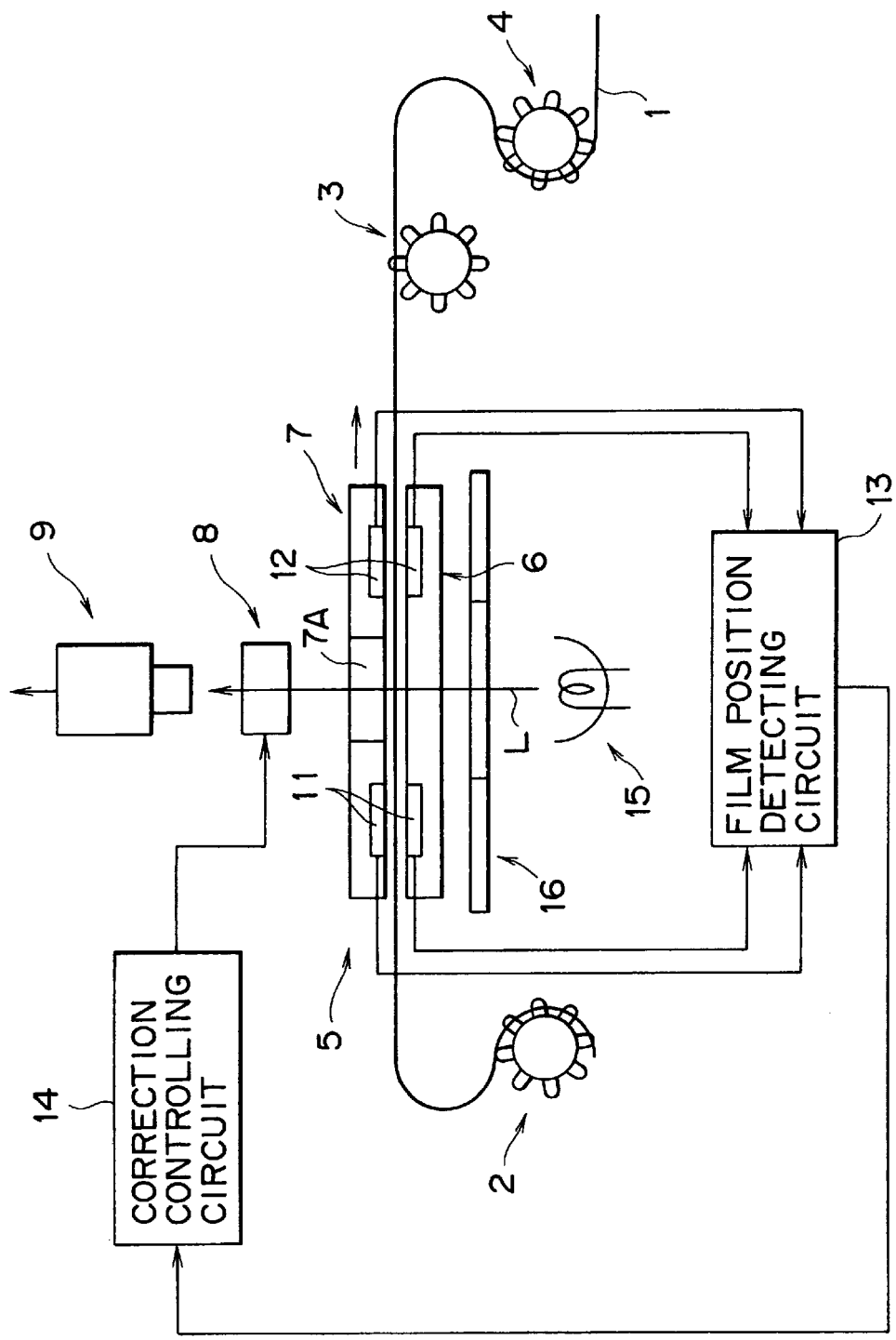
FIG. 1 is a diagram of a typical configuration of an embodiment implementing a telecinematographic apparatus provided by the present invention.

FIG. 1 is a diagram showing a typical configuration of an embodiment implementing a telecinematographic apparatus provided by the present invention.

In this telecinematographic apparatus, for example, while a 35 mm cinematographic film 1 is being run in an intermittent motion, an image recorded in each frame of the film 1 is photographed by a CCD camera 9 to convert the image into a television signal.

The cinematographic film 1 is lead from a supply reel (not shown in the figure) to a continuous feeding sprocket 2. Perforations (sprocket holes 10) of the cinematographic film 1 are engaged with teeth on the edge surface on the circumference of the continuous feeding sprocket 2, causing the film 1 to be fed forward continuously. The cinematographic film 1 fed forward by the continuous feeding sprocket 2 is supplied to an intermittent feeding sprocket 3 through a gate unit 5 (film guiding means) which comprises a fixed side picture gate 6 and a movable side picture gate 7.

The sprocket holes 10 of the cinematographic film 1 are also engaged with sprocket teeth on the edge surface on the circumference of the intermittent feeding sprocket 3, causing the film 1 to be fed forward intermittently. That is to say, the intermittent feeding sprocket 3 rotates by a predetermined angular unit with predetermined timing at one time. Typically, the intermittent feeding sprocket 3 rotates intermittently by 24 rotations per second. As a result, the cinematographic film 1 is fed forward in such an intermittent motion that a frame on which an image of the cinematographic film 1 is recorded is halted instantaneously at a predetermined position at the gate unit 5.

The cinematographic film 1 fed forward by the intermittent feeding sprocket 3 is put in a state of being engaged with a continuous feeding sprocket 4 and is ejected from the telecinematographic apparatus.

As described above, the gate unit 5 comprises the fixed side picture gate 6 and the movable side picture gate 7. A portion of a surface of the fixed side picture gate 6 exposed to the cinematographic film 1 is cut out so that a light generated by a light source 15 can be radiated to the cinematographic film 1 as shown in FIG. 3 to be described later. An opening 7A with a size larger than that of a frame to some extent is bored through a portion of a surface of the movable side picture gate 7 exposed to the cinematographic film 1 so that light passing through the cinematographic film 1 can pass through the opening 7A. Here, the intermittent feeding sprocket 3 feeds forward the cinematographic film 1 in such intermittent motion that the cinematographic film 1 is intermittently halted at a predetermined position exposed to the opening 7A in the moving side picture gate 7.

The moving side picture gate 7 applies a predetermined pressure to the cinematographic film 1 against the fixed side picture gate 6. The predetermined pressure causes the cinematographic film 1 to be sandwiched between the moving side picture gate 7 and the fixed side picture gate 6. It should be noted, however, that the predetermined pressure has to be set at such an appropriate value that the cinematographic film 1 can travel intermittently as well as smoothly.

On the side opposite to the surface of the fixed-side picture gate 7 exposed to the cinematographic film 1, a shutter 16 and the light source 15 are provided. The shutter 16 is in a closed state while the intermittently advancing cinematographic film 1 is running. That is to say, the shutter 16 is put in an open state only when the cinematographic film 1 is halted. As a result, a light generated by the light source 15 is radiated to the cinematographic film 1 by way of the shutter 16 only when the film 1 is put in a halted state. The light radiated to the cinematographic film 1 passes through an image recorded on the cinematographic film 1. The light passing through the cinematographic film 1 then passes through the opening 7A on the moving side picture gate 7 and enters the CCD camera 9 by way of an optical axis correcting unit 8 (positional shift correcting means).

At the CCD camera 9, the light passing through an image recorded on the cinematographic film 1 is converted into an output electrical signal in a photo-electric conversion process.

On the other hand, a plurality of sensing devices for detecting the position of the cinematographic film 1 are provided on the gate unit 5. In the present embodiment, the sensing devices are implemented by sensors 11 and 12, (film position detecting means). The sensors 11 and 12 are aligned in a direction in which the cinematographic film 1 runs over the opening 7A bored through the movable side picture gate 7, and are placed at positions symmetrical with respect to the opening 7A on the upstream and downstream sides of the movement of the cinematographic tape 1 with respect to the opening 7A. Signals output by the sensors 11 and 12 are both supplied to the film position detecting circuit 13. The position of the cinematographic film 1 put in a halted state is detected by the film position detecting circuit 13 by using at least one of the signals output by the sensors 11 and 12.

To put it in detail, it is ideal to place a frame of the cinematographic film 1, which is to be exposed to the opening 7A when the intermittently fed film 1 is halted, at a predetermined position with a high degree of accuracy. In actuality, however, the cinematographic film 1 is shifted from such a predetermined position by shifts in the longitudinal (film running) and transversal (film width) directions, resulting in image blurring in some cases as described earlier. There, the film position detecting circuit 13 detects a positional shift from the predetermined position, a natural position at which the cinematographic film 1 is supposed to be halted. A signal representing the magnitude of the positional shift is then supplied by the film position detecting circuit 13 to a correction controlling circuit 14.

The correction controlling circuit 14 controls the optical axis correcting unit 8 located between the opening 7A and the CCD camera 9 in accordance with the signal generated by the film position detecting circuit 13. A suitable optical axis correcting unit 8 is described in U.S. Pat. No. 5,608,474, issued Mar. 4, 1997, to the assignee of the present application, and incorporated herein by reference. The optical axis correcting unit 8 corrects an optical axis L of the light originating from the light source 15 and passing through the cinematographic film 1 so as to reduce the amount of image blurring caused by the positional shift of the film 1. As a result, an image with no picture blurring can be photographed by the CCD camera 9.

The following is an explanation of how the position of the cinematographic film 1 is detected by using the sensors 11 and 12. As a typical technique for detecting the position of the cinematographic film 1, the present embodiment adopts an electrostatic capacity method based on changes in electrostatic capacity of capacitors. It should be noted, however, that the description is not intended to be construed in a limiting sense. That is to say, the technique for detecting the position of the cinematographic film 1 is not specially limited to the electrostatic capacity method.

It is also worth noting that, since the electrostatic capacity method is described in detail in documents such as co-pending U.S. patent application Ser. No. 08/736,604, which is incorporated herein by reference and submitted by the patent applicant earlier, the method is explained only briefly in the present specification.

The explanation begins with reference to FIGS. 2(A) and 2(B), diagrams showing a typical configuration of the sensor 11. Since the sensor 12 has a configuration identical with that of the sensor 11, only the sensor 11 is explained. It should be noted that FIG. 2(A) is a plane diagram showing the sensor 11 as viewed from the side of the CCD camera 9 (with the moving side gate 7 removed) while FIG. 2(B) is a diagram showing a cross section of the sensor 11.

As shown in FIG. 2(B), an insulation substance 27 is embedded in the fixed side picture gate 6 and longitudinal direction electrodes 21 to 23 and transversal direction electrodes 24 to 26 are embedded in an insulation substance 27.

As shown in FIG. 2(A), the electrodes 21 to 23 are provided at positions which are exposed sequentially to the series of sprocket holes 10 on the cinematographic film 1 when the film 1 moves forward intermittently through the gate unit 5. The longitudinal direction electrodes 21 and 22 each have nearly a square shape with a size smaller than the sprocket hole 10 to some extent and are arranged in the longitudinal direction. The electrodes 21 and 22 constitute a pair of position detecting electrodes for detecting a position of the cinematographic film 1 in the longitudinal direction. The surrounding spaces of the sensors 21 and 22 are filled up with the insulation substances 27 which are further surrounded by the embedded electrode 23 serving as an auxiliary electrode. As shown in FIG. 2(A), with the cinematographic film 1 halted at a natural position at which the film 1 is supposed to be halted, the right side half of the longitudinal direction sensor 21 is exposed to a sprocket hole 10 whereas the left side half of the sensor 21 is exposed to an unperforated portion of the film 1 on the left hand side of the sprocket hole 10. At the same time, the left hand side half of the longitudinal direction sensor 22 is exposed to the same sprocket hole 10 whereas the right hand side half of the sensor 22 is exposed to an unperforated portion of the film 1 on the right hand side of the sprocket hole 10.

The transversal (i.e., widthwise) direction electrodes 24 and 25 each have nearly a rectangular shape and are arranged in the transversal direction. The transversal direction electrodes 24 and 25 constitute a pair of position detecting electrodes for detecting a position of the cinematographic film 1 in the transversal direction. The surrounding spaces of the transversal direction sensors 24 and 25 are filled up with the insulation substances 27 which are further surrounded by an embedded electrode 26 serving as an auxiliary electrode. It should be noted that, the transversal direction electrode 24 is placed at such a location that, with the cinematographic film 1 running intermittently along a line on the gate portion 5 to be followed naturally, the inner half of the sensor 24 is exposed to the film 1. The transversal direction electrode 25 is placed at such a location that, with the cinematographic film 1 running through the gate portion 5, the electrode 25 is exposed to a portion of the edge of the film 1. With the cinematographic film 1 halted at a natural position at which the film 1 is supposed to be halted, some of the inner half of the sensor 24 is exposed to a sprocket hole 10 while the outer half of the sensor 24 is exposed to an unperforated portion of the film 1 at the same time that the inner half of the transversal direction sensor 25 is exposed to the film 1.

On a portion of the movable side picture gate 7 exposed to the longitudinal direction electrodes 21 to 23 and the transversal direction electrodes 24 to 26, a ground electrode 28 having a planar shape with an area sufficiently larger than a total area of the electrodes 21 to 26 is provided. The ground electrode 28 is an electrode connected to the ground. In such an arrangement, the ground electrode 28 on the moveable side picture gate 7 and the electrodes 21 to 26 on the fixed side picture gate 6 form a planar electrode capacitor. In general, areas surrounding the sprocket hole 10 on the cinematographic film 1 are made of a material such as triacetate (TAC) or polyester (PET). In addition, the electrostatic capacity of the plane electrode capacitor is generally proportional to the dielectric constant of an insulation substance sandwiched by the electrode plates composing the capacitor. Since the insulation substance's relative dielectric constant, that is, a ratio of the dielectric constant of the insulation substance to that of air, is comparatively high, the electrostatic capacity of the planar electrode capacitor is higher with an insulation substance such as the cinematographic film 1 other than a sprocket hole 10 serving as a material sandwiched by the two electrode plates composing the capacitor than with air serving as the sandwiched material.

With the longitudinal direction electrodes 21 and 22 and the transversal direction electrodes 24 and 25 arranged in a layout described above, if the cinematographic film 1 is halted exactly at a natural position at which the film 1 is supposed to be halted, the electrostatic capacity of a longitudinal direction capacitor composed of the ground electrode 28 and the longitudinal direction electrode 21 is equal to the electrostatic capacity of a longitudinal direction capacitor composed of the ground electrode 28 and the longitudinal direction electrode 22 whereas the electrostatic capacity of a transversal direction capacitor composed of the ground electrode 28 and the transversal direction electrode 24 is equal to the electrostatic capacity of a transversal direction capacitor composed of the ground electrode 28 and the transversal direction electrode 25. As a result, by comparison of the electrostatic capacity of the longitudinal direction capacitor composed of the ground electrode 28 and the longitudinal direction electrode 21 with the electrostatic capacity of the longitudinal direction capacitor composed of the ground electrode 28 and the longitudinal direction electrode 22, the position of the cinematographic film 1 in the longitudinal direction can be determined. By the same token, by comparison of the electrostatic capacity of the transversal direction capacitor composed of the ground electrode 28 and the transversal direction electrode 24 with the electrostatic capacity of the transversal direction capacitor composed of the ground electrode 28 and the transversal direction electrode 25, the position of the cinematographic film 1 in the transversal direction can be determined.

It should be noted that, in actuality, the position of the cinematographic film 1 in the longitudinal direction can be determined by using merely the longitudinal direction capacitor composed of only either the longitudinal direction electrode 21 or 22 and the ground electrode 28. In the present embodiment, however, the longitudinal direction electrodes 21 and 22 are provided as a pair of electrodes exposed to the front and back edges of a sprocket hole 10. That is, the transversal direction edges of a sprocket hole 10, and the longitudinal direction capacitor composed of the ground electrode 28 and the longitudinal direction electrode 21 and the longitudinal direction capacitor composed of the ground electrode 28 and the longitudinal direction electrode 22 are both used in the detection of the position of the cinematographic film 1 in the longitudinal direction in order to increase the stability and the sensitivity of the detection. This contrivance is also applied to the detection of the position of the cinematographic film 1 in the transversal direction by using the transversal direction capacitor composed of the ground electrode 28 and the transversal electrode 24 and the transversal direction capacitor composed of the ground electrode 28 and the transversal electrode 25.

It should be noted that the longitudinal direction auxiliary capacitor 23 is used to increase the accuracy of the detection of the position of the cinematographic film 1 in the longitudinal direction by using the longitudinal direction electrodes 21 and 22 whereas the transversal direction auxiliary capacitor 26 is used to increase the accuracy of the detection of the position of the cinematographic film 1 in the transversal direction by using the transversal direction electrodes 24 and 25.

Much like the sensor 11, the sensor 12 also comprises longitudinal direction plane electrode capacitors composed of the ground electrode 28 and the longitudinal direction electrodes 21 to 23 for detecting the position of the cinematographic film 1 in the longitudinal direction and transversal direction plane electrode capacitors composed of the ground electrode 28 and the transversal direction electrodes 24 to 26 for detecting the position of the film 1 in the transversal direction. While a set of longitudinal direction electrodes and transversal direction electrodes is enough for each of the sensors 11 and 12, the sensors 11 and 12 may each comprise a plurality of such electrode sets. To put it in detail, the number of pairs each comprising the longitudinal direction electrodes 21 and 22 may be increased. In this case, the output level representing a result of detection of the position of the cinematographic film 1 in the longitudinal direction is raised and, in place of a result of a detection output only by a pair of longitudinal direction electrodes, an average value of results of detection is used, allowing the accuracy of the detection to be improved. By the same token, the number of pairs each comprising the transversal direction electrodes 24 and 25 may be increased. In this case, the output level representing a result of detection of the position of the cinematographic film 1 in the transversal direction is raised and, in place of a result of detection output only by a pair of transversal direction electrodes, an average value of results of detection is used, allowing the accuracy of the detection to be improved.

FIG. 3 is a diagram showing a perspective view of the fixed side picture gate 6.

In the present embodiment, the sensors 11 are 12 are installed at positions in the upstream and downstream sides, respectively, of the movement of the cinematographic tape 1 with respect to a projection area 31, that is, at positions in the longitudinal direction before and after the projection area 31. The projection area 31 is an area on the fixed side picture gate 6 which is exposed to the opening 7A on the movable side picture gate 7. The sensor 11 has one electrode pair comprising the longitudinal direction electrodes 21 and 22 for detecting the position of the cinematographic film 1 in the longitudinal direction on one side of the transversal direction of the fixed side picture gate 6. Since there is also one such electrode pair on the other side of the transversal direction of the fixed side picture gate 6, the sensor 11 has a total of 2 longitudinal direction electrode pairs. As for the transversal direction electrodes 24 and 25 for detecting the position of the cinematographic film 1 in the transversal direction, the sensor 11 has one pair of such electrodes on one side of the longitudinal direction of the fixed side picture gate 6. Since there is also such an electrode pair on the other side of the longitudinal direction of the fixed side picture gate 6, the sensor 11 has a total of two transversal direction electrode pairs. The sensor 12 has the same arrangement of longitudinal and transversal direction electrode pairs as the sensor 11.

Figure 4:
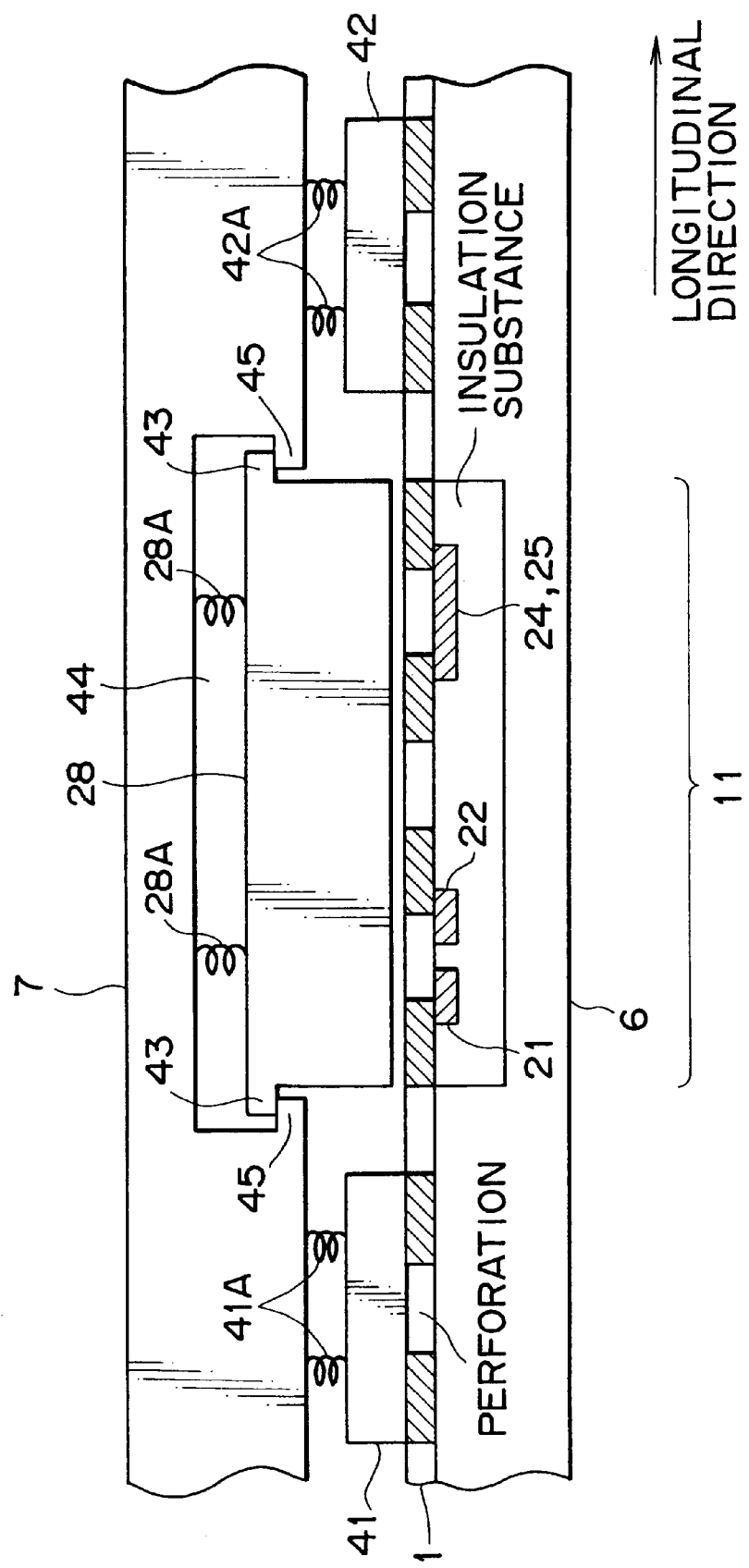
FIG. 4 is an enlarged cross sectional view, with portions broken away, of a gate unit 5 employed in the telecinematographic apparatus shown in FIG. 1.

FIG. 4 is a diagram showing a cross section of the gate unit 5 shown in FIG. 1.

A film presser 41 is provided at a position on the upstream side of the movement of the cinematographic film 1 with respect to the sensor 11, that is, at a position in the longitudinal direction before the sensor 11. The film presser 41 is pressed down by springs 41A attached to the movable side picture gate 7 against the fixed side picture gate 6. By the same token, a film presser 42 is provided at a position on the downstream side of the movement of the cinematographic film 1 with respect to the sensor 11, that is, at a position in the longitudinal direction after the sensor 11. The film presser 42 is pressed down by springs 42A attached to the movable side picture gate 7 against the fixed side picture gate 6. The cinematographic film 1 is sandwiched between the fixed side picture gate 6 and the presser 41 as well as 42 without generating film slack. It should be noted that, the film pressers 41 and 42 are pressed down by such forces of the springs 41A and 42A, respectively, that portions of the cinematographic film 1 such as a joint which has a thickness greater than the normal thickness of the film are capable of passing through the gate portion 5 without any hindrances. The arrangement of the film pressers 41 and 42 and the springs 41A and 42A is applied to the sensor 12 as well.

The ground electrode 28, also referred to as a common electrode, is also pressed down by springs 28A against the fixed side picture gate 6. As shown in FIG. 4, however, horizontal protrusions 43 on the right and left sides of a surface of the ground electrode 28 opposite to the surface exposed to the fixed side picture gate 6 are caught respectively by right and left horizontal protrusions 45 provided on a scooped portion 44 of the movable side picture gate 7. As a result, a gap is created between the ground electrode 28 and the fixed side picture gate 6. The gap has a thickness at least greater to some extent than the thickness of the cinematographic film 1. The thickness of the gap has a typical thickness of about 200 $\mu$m whereas the thickness of the cinematographic film 1 has a value in the range about 120 to 160 $\mu$m. It should be noted that, much like the film pressers 41 and 42, the ground electrode 28 is pressed down by such a force of the spring 28A that portions of the cinematographic film 1 such as a joint which has a thickness greater than the normal thickness of the rest are capable of passing through the gate portion 5 without hindrances.

Figure 5:
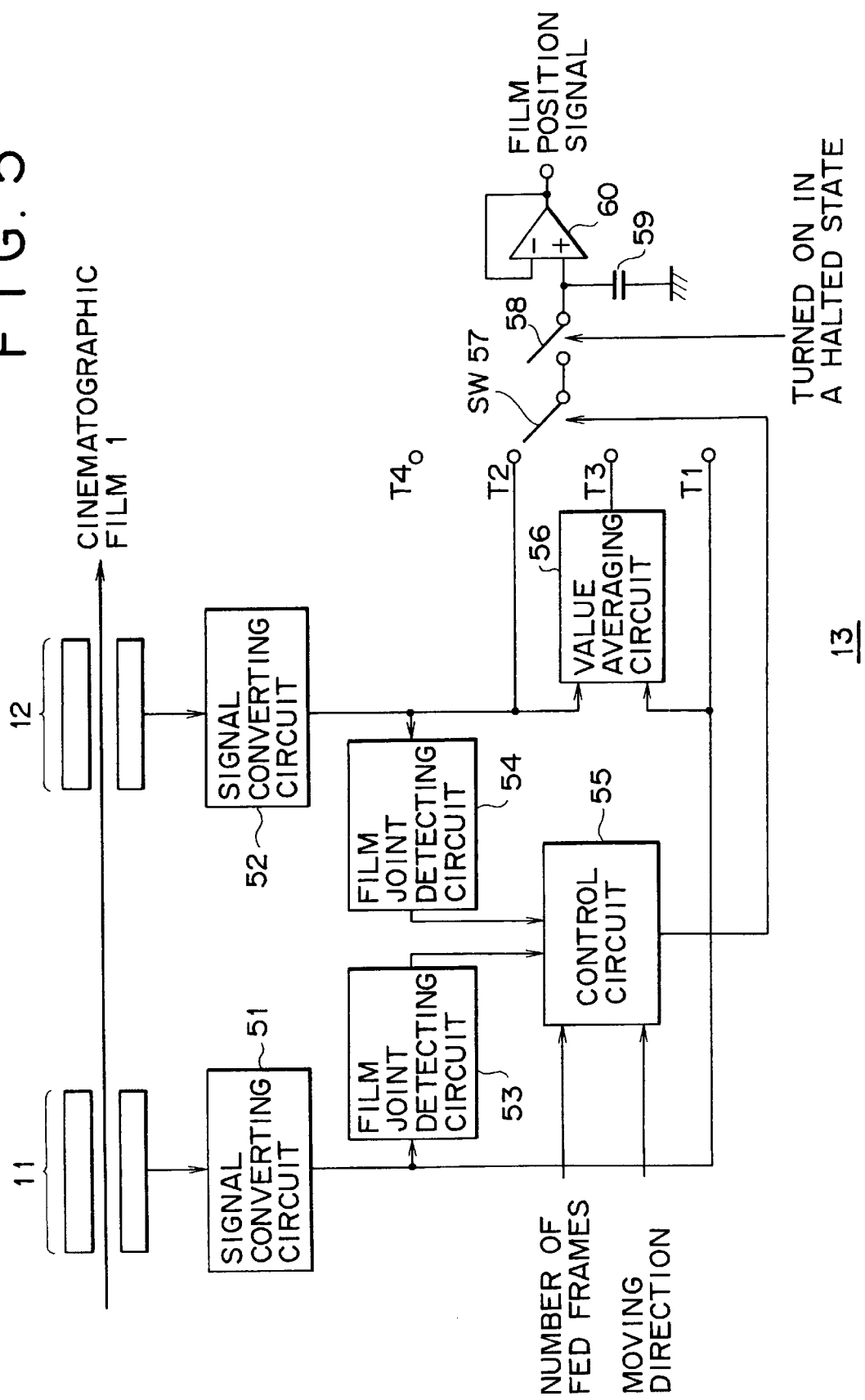
FIG. 5 is a block diagram of a typical configuration of the film position detecting circuit 13 employed in the telecinematographic apparatus shown in FIG. 1.

FIG. 5 is a block diagram showing a typical configuration of the film position detecting circuit 13 shown in FIG. 1.

As shown in the figure, signals output by the sensors 11 and 12 are supplied to signal converting circuits 51 and 52 respectively. The signals output by the sensors 11 and 12 to represent results of detection of the position of the cinematographic film 1 are converted into voltages by the signal converting circuits 51 and 52 respectively. The voltage output by the signal converting circuit 51 is supplied to a film joint detecting circuit 53, a value averaging circuit 56 and a terminal T1 of a switch 57. By the same token, the voltage output by the signal converting circuit 52 is supplied to a film joint detecting circuit 54, the value averaging circuit 56 and a terminal T2 of the switch 57.

The film joint detecting circuit 53 performs a judgment as to whether or not a joint of the cinematographic film 1 is passing through the sensor 11 on the basis of the voltage output by the signal converting circuit 51 and supplies a result of the judgment to a control circuit 55. By the same token, the film joint detecting circuit 54 performs a judgment as to whether or not a joint of the cinematographic film 1 is passing through the sensor 12 on the basis of the voltage output by the signal converting circuit 52 and supplies a result of the judgment to the control circuit 55.

The results of the judgments from the film joint detecting circuits 53 and 54, data indicating the number of frames by which the cinematographic film 1 has been fed, and data indicating the direction of the intermittent motion of the film 1, that is, whether the film is run in the forward direction from the left to the right shown in FIG. 1 or in the backward direction from the right to the left shown in FIG. 1 are input to the control circuit 55. Using this information, the control circuit 55 controls the switch 57. It should be noted that the number of frames by which the cinematographic film 1 has been fed and the information on the direction of the intermittent motion of the film 1 are generated by circuits not shown in the figure typically from information such as the rotational angle and the rotational direction of the intermittent feeding sprocket 3 employed in the telecinematographic apparatus shown in FIG. 1.

The value averaging circuit 56 computes the average value of the signals output by the signal converting circuits 51 and 52 and supplies the average value to a terminal T3 of the switch 57. The switch 57 connects the output terminal thereof to the terminals T1, T2, T3 or T4 in accordance with a control signal output by the control circuit 55. It should be noted that the terminal T4 is connected to nothing and is thus put in a so-called disconnected state.

During the intermittent motion of the cinematographic film 1, a switch 58 is correspondingly turned off while the film 1 is moving and turned on when the film 1 is stopped. The combination of the switch 58 and the capacitor 59 act as a sample and hold circuit when the film is in motion. Only when the cinematographic film 1 is halted does the switch 57 pass on a signal to one terminal of a capacitor 59 and the non-inverting (+) input terminal of the operational amplifier 60. The other terminal of the capacitor 59 is connected to the ground. The output terminal of the operational amplifier 60 is connected to the inverting (−) input terminal thereof. In such a circuit arrangement, the operational amplifier 60 outputs a signal following the signal supplied to the non-inverting (+) input terminal of the operational amplifier 60, that is, a film position signal representing the current position of the cinematographic film 1 when the film 1 is halted and the last halted position of the film when the film is again moving.

Figure 6:
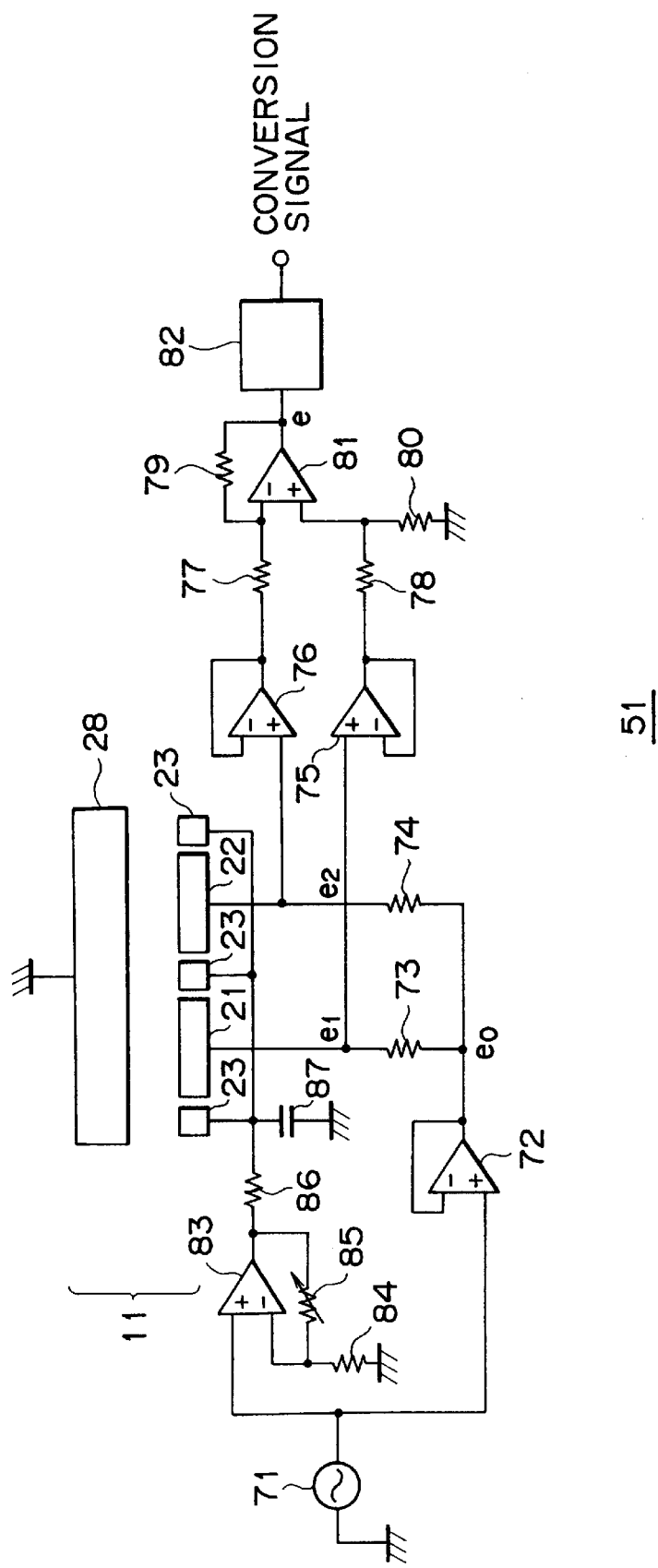
FIG. 6 is a circuit diagram of a typical configuration of a signal converting circuit 51 or 52 employed in the film position detecting circuit 13 shown in FIG. 5.

FIG. 6 is a circuit diagram showing a typical configuration of the signal converting circuit 51 shown in FIG. 5. Since the configuration of the signal converting circuit 52 is identical with that of the circuit 51, only the configuration of latter is shown and explained. It should be noted that FIG. 6 shows only a portion for converting a result of detection of a position in the longitudinal direction of the cinematographic film 1 output by the sensor 11 into a voltage or the sensor 12 in the case of the signal converting circuit 52. A portion for converting a result of detection of a position in the transversal direction of the cinematographic film 1 can be also implemented by the same circuit as that shown in FIG. 6.

As shown in the figure, an AC voltage generated by an AC voltage generator 71 is supplied to the non-inverting (+)

input terminal of an operational amplifier 83 whereas the inverting (−) input terminal thereof is connected to the ground by a resistor 84. One end of a variable resistor 85 is connected to a junction point between the resistor 84 and the inverting (−) input terminal of the operational amplifier 83 whereas the other end of the resistor 85 is connected to the output terminal of the amplifier 83. In such a circuit arrangement, the operational amplifier 83 outputs an amplified signal of the AC voltage supplied by the AC voltage generator 71 to the non-inverting (+) input signal of the amplifier 83.

One end of a resistor 86 is connected to the output terminal of the operational amplifier 83 whereas the other end of the resistor 86 is connected to one terminal of a capacitor 87. The other terminal of the capacitor 87 is connected to the ground. The junction point between the resistor 86 and the capacitor 87 is connected to the electrodes 23 which are used as auxiliary electrodes. Thus, a predetermined AC voltage is applied to the electrodes 23. The predetermined AC voltage is applied to the electrodes 23 in order to increase the accuracy of detection of the position of the cinematographic film 1 as described above.

It should be noted that, in the case of the equivalent signal converting circuit portion for converting a result of detection of a position in the transversal direction of the cinematographic film 1, the junction point between the resistor 86 and the capacitor 87 is connected to the electrodes 26 of FIG. 2 which are used as auxiliary electrodes.

The AC voltage generated by the AC voltage generator 71 is also supplied to the non-inverting (+) input terminal of an operational amplifier 72, the inverting (−) input terminal and the output terminal of which are connected to each other. The junction point between the inverting (−) input terminal and the output terminal of the operational amplifier 72 is connected to one ends of resistors 73 and 74. The other ends of the resistors 73 and 74 are connected to the electrodes 21 and 22, respectively.

The junction point between the resistor 73 and the electrode 21 is connected to the non-inverting (+) input terminal of an operational amplifier 75, the inverting (−) input terminal and the output terminal of which are connected to each other. The output terminal of the operational amplifier 75 is also connected to one end of a resistor 78 and the other end of the resistor 78 is connected to the non-inverting (+) input terminal of an operational amplifier 81. The junction point between the other end of the resistor 78 and the non-inverting (+) input terminal of the operational amplifier 81 is connected to one end of a resistor 80, the other end of which is connected to the ground.

The junction point between the resistor 74 and the electrode 22 is connected to the non-inverting (+) input terminal of an operational amplifier 76, the inverting (−) input terminal and the output terminal of which are connected to each other. The output terminal of the operational amplifier 76 is also connected to one end of a resistor 77 and the other end of the resistor 77 is connected to the inverting (−) input terminal of the operational amplifier 81. The junction point between the other end of the resistor 77 and the inverting (−) input terminal of the operational amplifier 81 is connected to one end of a resistor 79, the other end of which is connected to the output terminal of the amplifier 81.

The resistors 77 to 80 typically have resistances equal to each other. Thus, the resistors 77 to 80 and the operational amplifier 81 form a subtractor for computing the difference between the outputs of the operational amplifiers 75 and 76.

It should be noted that, in the case of the equivalent signal converting portion for converting a result of detection of a position in the transversal direction of the cinematographic film 1, the resistors 73 and 74 are connected to the electrodes 24 and 25 of the sensor 11 or 12 shown in FIG. 2, respectively, instead of the electrodes 21 and 22.

The output terminal of the operational amplifier 81 is connected to a signal detecting circuit 82 for detecting a signal output by the amplifier 81. A result of detection is converted into an output voltage signal representing a result of detection of a position in the longitudinal direction of the cinematographic film 1.

Assume that a voltage output by the operational amplifier 72 in the signal converting circuit 51 with the configuration described above is $e_0$. In this case, a voltage $e_1$ appearing at the junction point between the resistor 73 and the electrode 21, and a voltage $e_2$ appearing at the junction point between the resistor 74 and the electrode 22 are expressed by Eqs. (1) and (2) respectively as follows:

$$e_1 = e_0/(1+j\omega C_1 R_1) \qquad (1)$$

$$e_2 = e_0/(1+j\omega C_2 R_2) \qquad (2)$$

where $j^2 = -1$ and notation $\omega$ is the angular frequency of the AC voltage generated by the AC voltage source 71. Notation $C_1$ is the electrostatic capacity of a capacitor formed by the electrode 21 and the ground electrode 28, notation $C_2$ is the electrostatic capacity of a capacitor formed by the electrode 22 and the ground electrode 28 and notations $R_1$ and $R_2$ are the resistances of the resistors 73 and 74 respectively.

The electrostatic capacity $C_1$ of the capacitor formed by the electrode 21 and the ground electrode 28 reaches a minimum value when the gap between the electrode 21 and the ground electrode 28 is filled up with air, that is, when the entire electrode 21 is exposed to a sprocket hole 10, and attains a maximum value when the gap between the electrode 21 and the ground electrode 28 is filled up with an insulation substance of a portion of the cinematographic film 1 other than a sprocket hole 10. By the same token, the electrostatic capacity $C_2$ of the capacitor formed by the electrode 22 and the ground electrode 28 reaches a minimum value when the gap between the electrode 22 and the ground electrode 28 is filled up with air, that is, when the entire electrode 22 is exposed to a sprocket hole 10, and attains a maximum value when the gap between the electrode 22 and the ground electrode 28 is filled up with an insulation substance of a portion of the cinematographic film 1 other than a sprocket hole 10.

Assume that C is the minimum electrostatic capacity of the capacitor formed by the electrode 21 and the ground electrode 28, that is, the electrostatic capacity with the gap between the electrode 21 and the ground electrode 28 filled up with air. Assume that $C_1$ is a change in electrostatic capacity which is observed when the gap between the electrode 21 and the ground electrode 28 is fully or partially filled up with an insulation substance of a portion of the cinematographic film 1 other than a sprocket hole 10. Thus, the electrostatic capacity $C_1$ of the capacitor formed by the electrode 21 and the ground electrode 28 with the gap between the electrode 21 and the ground electrode 28 fully or partially filled up with an insulation substance of a portion of the cinematographic film 1 other than a sprocket hole 10 is expressed by Eq. (3) as follows:

$$C_1 = C + \Delta C_1 \qquad (3)$$

where $C \gg \Delta C_1$.

By the same token, C is the minimum electrostatic capacity of the capacitor formed by the electrode 22 and the ground electrode 28, that is, the electrostatic capacity with the gap between the electrode 22 and the ground electrode 28 filled up with air. Assume that $C_2$ is a change in electrostatic capacity which is observed when the gap between the electrode 22 and the ground electrode 28 is fully or partially filled up with an insulation substance of a portion of the cinematographic film 1 other than a sprocket hole 10. Thus, the electrostatic capacity $C_2$ of the capacitor formed by the electrode 22 and the ground electrode 28 with the gap between the electrode 22 and the ground electrode 28 fully or partially filled up with an insulation substance of a portion of the cinematographic film 1 other than a sprocket hole 10 is expressed by Eq. (4) as follows:

$$C_2 = C + \Delta C2 \quad (4)$$

where $C \gg \Delta C2$.

Assume that the operational amplifier 75 outputs $e_1$, a voltage supplied to the non-inverting input terminal thereof, the operational amplifier 76 outputs $e_2$, a voltage supplied to the non-inverting input terminal thereof, and $R_1 = R_2 = R$. A voltage e appearing at the output terminal of the operational amplifier 79 is the difference between $e_1$ and $e_2$ expressed as follows:

$$e = e_1 - e_2$$

Substituting the right hand expressions of Eq. (1) and Eq. (2) for $e_1$ and $e_2$ in the above equation respectively yields the following:

$$e = e_0/(1 + j\omega C_1 R_1) - e_0/(1 + j\omega C_2 R_2)$$

Then, substituting the right hand expression of Eq. (3) for $C_1$ and the right hand expression of Eq. (4) for $C_2$ in the above equation yields the following:

$$e = e_0/[1 + j\omega(C + \Delta C_1)R] - e_0/[1 + j\omega(C + \Delta C_2)R] = j\omega(\Delta C_2 - \Delta C_1)e_0/(1 + j\omega CR)^2 \quad (5)$$

If the cinematographic film 1 is halted at a natural position at which the film 1 is supposed to be halted in the longitudinal direction, from the way the electrodes 21 and 22 are located as described above, $\Delta C_1$ is equal to $\Delta C_2$, resulting in a voltage e of 0.

As described above, 4 sprocket holes 10 are provided for each frame of the cinematographic film 1 on the right, left, upstream and down stream sides of the sprocket hole 10. Thus, while the cinematographic film 1 is being run intermittently, a conversion signal is output by the operational amplifier 81, which serves as a subtractor, through the signal detecting circuit 82 with a waveform shown in FIG. 7. As shown in the figure, while the cinematographic film 1 is running, the signal detecting circuit 82 outputs a sinusoidal wave having 4 periods. With the cinematographic film 1 halted, on the other hand, the signal output by the signal detecting circuit 82 is set at a level indicating a position at which the film 1 is halted. In the present embodiment, when the cinematographic film 1 is halted at a natural position at which the film 1 is supposed to be halted in the longitudinal direction, the conversion signal is 0 V as described above.

The description given so far also holds true of the detection of the position of the cinematographic film 1 in the transversal direction.

Basically, the film position detecting circuit 13 shown in FIG. 5 supplies the conversion signal, which is generated when the cinematographic film 1 is halted, to the correction controlling circuit 14 employed in the telecinematographic apparatus shown in FIG. 1. Then, the optical axis correcting unit 8 corrects the optical axis in accordance with a control signal generated by the correction controlling circuit 14.

Next, the operation of the film position detecting circuit 13 shown in FIG. 5 is explained by referring to operational charts thereof shown in FIGS. 8(A) to 8(G).

For example, assume now that a cinematographic film 1, wherein a joint created on a portion thereof has a splicing tape shorter to some extent than the longitudinal length of the frame stuck on the portion, is running in a forward direction, that is, a direction from the sensor 11 to the sensor 12 as shown in FIG. 8(A). Also assume that the width of the splicing tape is equal to the transversal direction size of the cinematographic film 1. As shown in FIG. 8(A), the sensors 11 and 12 are provided at positions each separated away from the projection area 31 by a distance equal to half a frame. As shown in FIG. 3, the projection area 31 is a portion of the fixed side picture gate 6 which is exposed to the opening 7A on the movable side picture gate 7. Thus, the distance from the edge of the sensor 11 on the side of the projection area 31 to the edge of the sensor 12 on the side of the projection area 31 is about equal to the widths of 2 frames in the longitudinal direction. In addition, the sensors 11 and 12 each have a length in the longitudinal direction nearly equal to the length of a frame.

Figure 7:
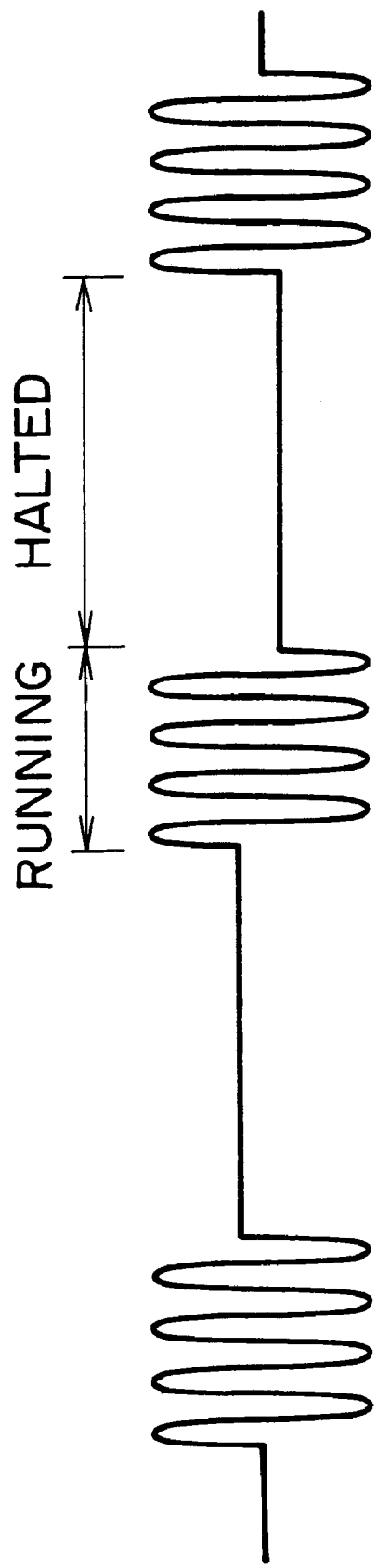
FIG. 7 is a waveform diagram of a signal output by the film position detecting circuit 13 shown in FIG. 5 to represent the position of a film.

In this case, before the joint of the cinematographic film 1 passes through the sensor 11, thus, before the joint passes through the sensor 12, the conversion signal $s_1$ of FIG. 8(B) generated by the signal converting circuit 51 connected to the sensor 11 has the same waveform as that shown in FIG. 7. By the same token, the conversion signal $s_2$ of FIG. 8(C) generated by the signal converting circuit 52 connected to the sensor 12 also has the same waveform as that shown in FIG. 7. It should be noted that FIGS. 8(B) and 8(C) show envelop lines enclosing the waveforms $s_1$ and $s_2$ respectively in a simple and plain manner.

In this case, the control circuit 55 drives the switch 57 to select the terminal T3 as shown in FIG. 8(G). As described earlier, the value averaging circuit 53 supplies a signal to the terminal T3. The signal output by the value averaging circuit 53 is the average value of the conversion signal $s_1$ output by the signal converting circuit 51 and the conversion signal $s_2$ output by the signal converting circuit 52 with the cinematographic film 1 put in a halted state. Thus, before the joint of the cinematographic film 1 passes through the sensor 11, the average value of the conversion signals $s_1$ and $s_2$ is output as a signal representing the position of the film 1 which is used as a base in the optical axis correcting unit 8 for correcting the optical axis.

Then, as the joint of the cinematographic film 1 comes near the sensor 11, the conversion signal $s_1$ changes from the waveform shown in FIG. 7 to a waveform in a so-called disordered state (or an abnormal state). To put it in detail, since the joint of the cinematographic film 1 has a large thickness in comparison with the rest, the joint coming near the sensor 11 raises the ground electrode 28 which is pressed down by the spring 28A as explained earlier by referring to FIG. 4. As a result, the distance between electrode plates of the capacitor including the ground electrode 28 as one of the electrode plates is increased. In addition, with the joint of the cinematographic film 1 merely coming near the sensor 11, most of the gap between the electrode plates is filled up with air, reducing the electrostatic capacity of the capacitor. As a result, the amplitude of the conversion signal $s_1$ is reduced to a value smaller than that which is obtained normally when the sprocket hole 10 passes through the sensor 11.

Later on, as the cinematographic film 1 is further run forward, the gap of the capacitor including the ground electrode 28 as one of the electrode plates is occupied by the joint of the film 1. That is to say, as the gap is occupied by a dielectric substance comprising the cinematographic film 1 and the splicing tape stacked upon the film 1, the electrostatic capacity of the capacitor is increased. As a result, the amplitude of the conversion signal $s_1$ is also increased to a value larger than that which is obtained normally when the sprocket hole 10 passes through the sensor 11.

As described above, during a period starting from a time the joint of the cinematographic film 1 comes near the sensor 11 and ending at a time the joint leaves the sensor 11, the amplitude of the conversion signal $s_1$, which should naturally have a fixed value, decreases and increases as shown in FIG. 8(B). The film joint detecting circuit 53 performs a judgment as to whether or not a joint of the cinematographic film 1 is passing through the sensor 11 based on variations in amplitude of the conversion signal $s_1$ supplied to the film joint detecting circuit 53 by the signal converting circuit 51.

The film joint detecting circuit 53 supplies a result of the judgment shown in FIG. 8(D) to the control circuit 55. It should be noted that the O and X marks shown in FIG. 8(D) respectively indicate that a joint of the cinematographic film 1 does not exist and does exist at the sensor 11.

At a point of time that the control circuit 55 receives a result of the judgment indicating that a joint of the cinematographic film 1 exists at the sensor 11 from the film joint detecting circuit 53, an operation to count the number of frames intermittently fed from this point of time is started as shown in FIG. 8(F). The control circuit 55 further drives the switch 57 to select the terminal T2 as shown in FIG. 8(G). As described above, the conversion signal $s_2$ output by the signal converting circuit 52 is supplied to the terminal T2. Thus, in this case, the conversion signal $s_2$ is output as a signal representing the position of the cinematographic film 1 which is used as a base in the optical axis correcting unit 8 for correcting the optical axis.

Thereafter, the control circuit 55 keeps the switch 57 in a state of selecting the terminal T2 until the counted number of frames fed intermittently since the selection of the terminal T2 by the switch 57 becomes equal to 2 as shown in FIG. 8(G). As a result, in this case, the optical axis is corrected by using only the signal output by the sensor 12 without using the abnormal signal output by the sensor 11 for two frames from the detection of a film joint.

When the number of frames fed intermittently since the selection of the terminal T2 by the switch 57 becomes equal to 3, the control circuit 55 recognizes the fact that the joint of the cinematographic film 1 has passed through the sensor 11 and arrived at the sensor 12 after traveling a distance equal to the sum of a distance between the locations at which the sensors 11 and 12 are installed and the length of the joint in the longitudinal direction.

Much like the film joint detecting circuit 53, the film joint detecting circuit 54 performs a judgment as to whether or not a joint of the cinematographic film 1 is passing through the sensor 12 based on variations in amplitude of the conversion signal $s_2$ supplied to the film joint detecting circuit 54 by the signal converting circuit 52.

In detail then, when the number of frames fed intermittently since the selection of the terminal T2 by the switch 57 becomes equal to 3 and the film joint detecting circuit 53 outputs a judgment result indicating that no film joint exists at the sensor 11 (as shown in FIG. 8(D)) to the control circuit 55 while the film joint detecting circuit 54 outputs a judgment result indicating that a film joint exists at the sensor 12 (as shown in FIG. 8(E)) to the control circuit 55, the control circuit 55 drives the switch 57 to select the terminal T1 as shown in FIG. 8(G). Much like FIG. 8(D), the O and X marks shown in FIG. 8(E) respectively indicate that a joint of the cinematographic film 1 does not exist and does exist at the sensor 12. As described above, the conversion signal $s_1$ output by the signal converting circuit 51 is supplied to the terminal T1. Thus, in this case, the conversion signal $s_1$ is output as a signal representing the position of the cinematographic film 1 which is used as a basis in the optical axis correcting unit 8 for correcting the optical axis.

Thereafter, the control circuit 55 keeps the switch 57 in a state of selecting the terminal T1 until the counted number of frames fed intermittently since the selection of the terminal T2 by the switch 57 becomes equal to 5 as shown in FIG. 8(G). As a result, in this case, the optical axis is corrected by using only the signal output by the sensor 11 without using the abnormal signal output by the sensor 12.

Then, when the number of frames fed intermittently since the selection of the terminal T2 by the switch 57 becomes equal to 6, the control circuit 55 recognizes the fact that the joint of the cinematographic film 1 has passed through the sensor 12 after traveling a distance equal to the length of the joint in the longitudinal direction.

Thus, when the number of frames fed intermittently since the selection of the terminal T2 by the switch 57 becomes equal to 6, the film joint detecting circuit 53 outputs a judgment result to the control circuit 55 indicating that no film joint exists at the sensor 11 as shown in FIG. 8(D) and, by the same token, the film joint detecting circuit 54 also outputs a judgment result to the control circuit 55 indicating that no film joint exists at the sensor 12 as shown in FIG. 8(E).

Upon receiving those judgment results, the control circuit 55 drives the switch 57 to select the terminal T3 as shown in FIG. 8(G). As described above, the average value of the conversion signal $s_1$ output by the signal converting circuit 51 and the conversion signal $s_2$ output by the signal converting circuit 52 is supplied to the terminal T3. Thus, in this case, the average value is output as a signal representing the position of the cinematographic film 1 which is used as a base in the optical axis correcting unit 8 for correcting the optical axis.

It should be noted that, if the sensors 11 and 12 are swapped with each other, the signal converting circuits 51 and 52 are swapped with each other, the film joint detecting circuits 53 and 54 are swapped with each other and the terminals T1 and T2 are swapped with each other in the description given above, the above description will also hold true of a case in which the cinematographic film 1 is intermittently moved in the backward direction, that is, in a direction from the sensor 12 to the sensor 11.

Figure 9A:
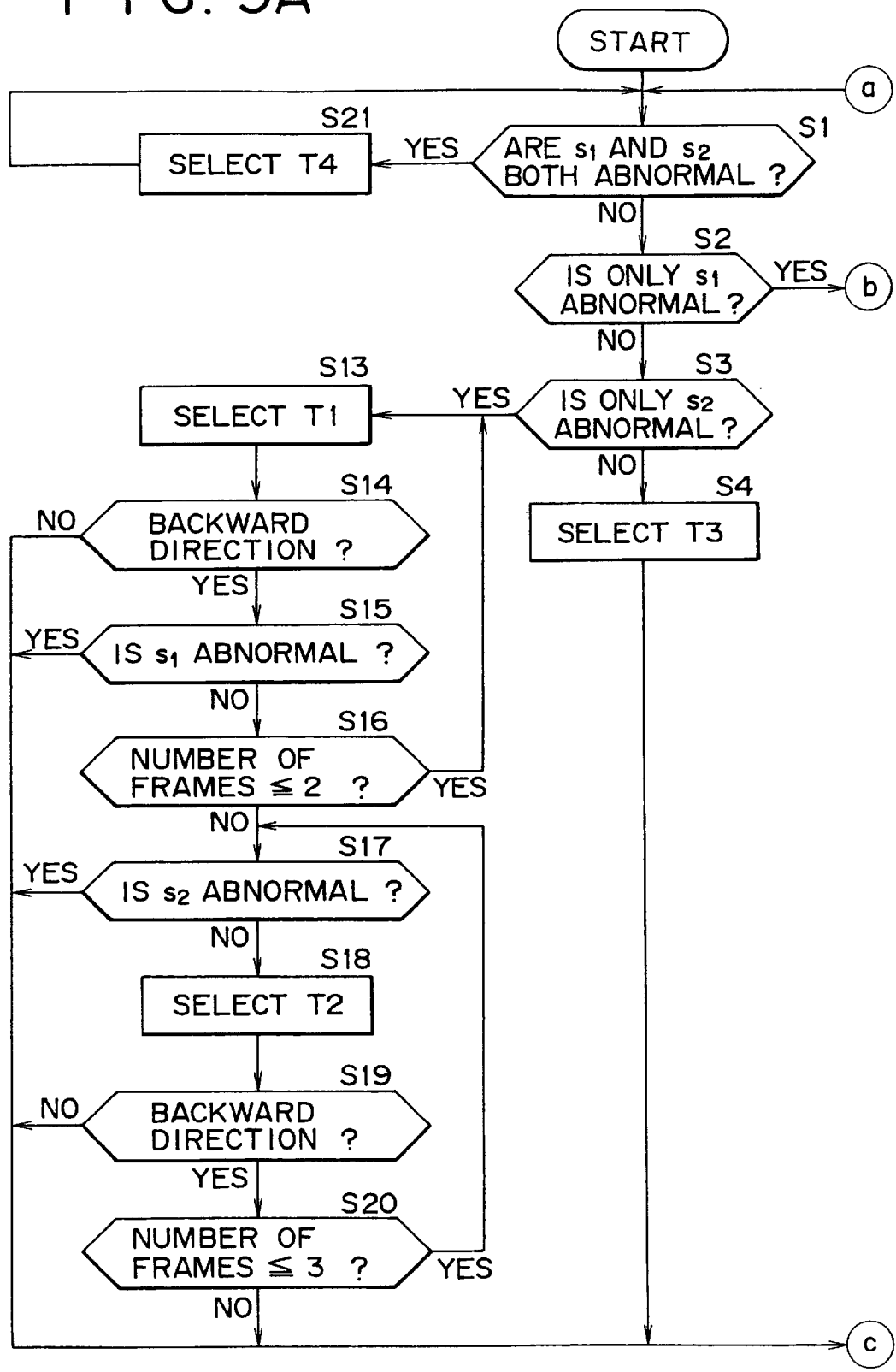
FIG. 9 is a flowchart representing the operation of a control circuit 55 employed in the film position detecting circuit 13 shown in FIG. 5.

Next, the operation of the control circuit 55 shown in FIG. 5 is explained by referring to a flowchart shown in FIG. 9.

As shown in the figure, the flowchart begins with a step S1 at which the control circuit 55 waits for the cinematographic film 1 to move by a distance corresponding to a frame, that is, waits for both the conversion signals $s_1$ and $s_2$ to become abnormal. In other words, at the step S1, the control circuit 55 performs a judgment as to whether or not a judgment result indicating the existence of a joint of the cinematographic film 1 at the sensor 11 has been received from the film joint detecting circuit 53 and a judgment result indicating the existence of a joint of the cinematographic film 1 at the sensor 12 has been received from the film joint detecting circuit 54. If the outcome of the judgment performed at the step S1 indicates that both the conversion signals $s_1$ and $s_2$ are normal, or either of the conversion signals $s_1$ or s2 are normal, then the flow of the operation goes on to a step S2 to perform a judgment as to whether or not only the conversion signal $s_1$ is abnormal. If the outcome of the judgment performed at the step S2 indicates that the conversion signal $s_1$ is normal, then the flow of the operation proceeds to a step S3 to perform a judgment as to whether or not only the conversion signal $s_2$ is abnormal.

If the outcome of the judgment performed at the step S3 indicates that the conversion signal $s_2$ is normal, that is, if both the conversion signals $s_1$ and $s_2$ are normal, then the flow of the operation proceeds to a step S4 at which the control circuit 55 drives the switch 57 to select the terminal T3. As a result, in this case, the average value of the conversion signals $s_1$ and $s_2$ is used as a base for correcting the optical axis.

If the outcome of the judgment performed at the step S2 indicates that only the conversion signal $s_1$ is abnormal, indicating that the film joint is passing through the sensor 11, then the flow of the operation proceeds to a step S5 at which the control circuit 55 drives the switch 57 to select the terminal T2. As a result, in this case, only the conversion signal $s_2$ from the sensor 12 is used as a base for correcting the optical axis.

Then, the flow of the operation continues to a step S6 at which the control circuit 55 waits for the cinematographic film 1 to move by a distance corresponding to a frame and performs a judgment as to whether or not the cinematographic film 1 has been intermittently fed further in the forward direction. If the outcome of the judgment performed at the step S6 indicates that the cinematographic film 1 has been intermittently fed not in the forward direction, that is, in the backward direction, then the flow of the operation returns to the step S1. If the outcome of the judgment performed at the step S6 indicates that the cinematographic film 1 has been intermittently fed in the forward direction, on the other hand, then the flow of the operation proceeds to a step S7 to perform a judgment as to whether or not the conversion signal $s_2$ is abnormal.

If the outcome of the judgment performed at the step S7 indicates that the conversion signal $s_2$ is abnormal, then the flow of the operation returns to the step S1. If the outcome of the judgment performed at the step S7 indicates that the conversion signal $s_2$ is not abnormal, on the other hand, then the flow of the operation proceeds to a step S8 to perform a judgment as to whether or not the counted number of frames fed since the selection of the terminal T2 by the switch 57 at the step S5 is equal to or smaller than 2. If the outcome of the judgment performed at the step S8 indicates that the counted number of frames fed since the selection of the terminal T2 by the switch 57 at the step S5 is equal to or smaller than 2, then the flow of the operation returns to the step S5. That is to say, if frames have been fed continuously in the forward direction since the selection of the terminal T2 by the switch 57 at the step S5, the counted number of frames fed since the selection of the terminal T2 by the switch 57 at the step S5 is equal to or smaller than 2 and the conversion signal $s_2$ is not abnormal, then only the conversion signal $s_2$ is used as a basis for correcting the optical axis. In this situation, the film joint is still beneath the sensor 11.

If the outcome of the judgment performed at the step S8 indicates that the counted number of frames fed since the selection of the terminal T2 by the switch 57 at the step S5 is neither equal to nor smaller than 2, that is, if the counted number of frames fed since the selection of the terminal T2 by the switch 57 at the step S5 has reached 3, on the other hand, then the flow of the operation goes on to a step S9 to perform a judgment as to whether or not the conversion signal $s_1$ is abnormal. If the outcome of the judgment performed at the step S9 indicates that the conversion signal $s_1$ is abnormal, then the flow of the operation returns to the step S1. If the outcome of the judgment performed at the step S9 indicates that the conversion signal $s_1$ is not abnormal, indicating that the film joint has passed through the sensor 11, then the flow of the operation proceeds to a step S10 at which the control circuit 55 drives the switch 57 to select the terminal T1. As a result, in this case, only the conversion signal $s_1$ of the sensor 11 is used as a basis for correcting the optical axis. In this situation, the film joint has passed through the sensor 11 and is either at the sensor 12 or soon will be.

Then, the flow of the operation continues to a step S11 at which the control circuit 55 waits for the cinematographic film 1 to move by a distance corresponding to a frame and performs a judgment as to whether or not the cinematographic film 1 has been intermittently fed further in the forward direction. If the outcome of the judgment performed at the step S11 indicates that the cinematographic film 1 has been intermittently fed not in the forward direction, that is, in the backward direction, then the flow of the operation returns to the step S1. If the outcome of the judgment performed at the step S11 indicates that the cinematographic film 1 has been intermittently fed in the forward direction, on the other hand, then the flow of the operation proceeds to a step S12 to perform a judgment as to whether or not the counted number of frames fed since the selection of the terminal T1 by the switch 57 at the step S10 is equal to or smaller than 3. If the outcome of the judgment performed at the step S12 indicates that the counted number of frames fed since the selection of the terminal T1 by the switch 57 at the step S10 is equal to or smaller than 3, then the flow of the operation returns to the step S9. That is to say, if frames have been fed continuously in the forward direction since the selection of the terminal T1 by the switch 57 at the step S10, the counted number of frames fed since the selection of the terminal T1 by the switch 57 at the step S10 is equal to or smaller than 3, and the conversion signal $s_1$ is not abnormal, then only the conversion signal $s_1$ is used as a basis for correcting the optical axis.

If the outcome of the judgment performed at the step S12 indicates that the counted number of frames fed since the selection of the terminal T1 by the switch 57 at the step S10 is neither equal to nor smaller than 3, that is, if the counted number of frames fed since the selection of the terminal T1 by the switch 57 at the step S10 has reached 4, on the other hand, the flow of the operation returns to the step S1.

If the outcome of the judgment performed at the step S3 indicates that only the conversion signal $s_2$ is abnormal, then the flow of the operation proceeds to a step S13 at which the control circuit 55 drives the switch 57 to select the terminal T1. As a result, in this case, the film joint is beneath the sensor 12 and only the conversion signal $s_1$ from the sensor 11 is used as a basis for correcting the optical axis.

So far, only film forward projecting operation has been discussed. In some cases, the film may be run in reverse. After step S13, the flow of the operation continues to a step S14 at which the control circuit 55 waits for the cinematographic film 1 to move by a distance corresponding to a frame and performs a judgment as to whether or not the cinematographic film 1 has been intermittently fed further in the backward direction. If the outcome of the judgment performed at the step S14 indicates that the cinematographic film 1 has been intermittently fed not in the backward direction, that is, in the forward direction, then the flow of the operation returns to the step S1. If the outcome of the judgment performed at the step S14 indicates that the cinematographic film 1 has been intermittently fed in the backward direction, on the other hand, then the flow of the operation proceeds to a step S15 to perform a judgment as to whether or not the conversion signal $s_1$ is abnormal.

If the outcome of the judgment performed at the step S15 indicates that the conversion signal $s_1$ is abnormal, the flow of the operation returns to the step S1. If the outcome of the judgment performed at the step S15 indicates that the conversion signal $s_1$ is not abnormal, then the flow of the operation proceeds to a step S16 to perform a judgment as to whether or not the counted number of frames fed since the selection of the terminal T1 by the switch 57 at the step S13 is equal to or smaller than 2. If the outcome of the judgment performed at the step S16 is negative, then the flow of the operation returns to the step S13. That is to say, if frames have been fed continuously in the backward direction since the selection of the terminal T1 by the switch 57 at the step S13, the counted number of frames fed since the selection of the terminal T1 by the switch 57 at the step S13 is equal to or smaller than 2, and the conversion signal $s_1$ is not abnormal, then only the conversion signal $s_1$ is used as a basis for correcting the optical axis.

If the outcome of the judgment performed at the step S16 indicates that the counted number of frames fed since the selection of the terminal T1 by the switch 57 at the step S13 is neither equal to nor smaller than 2, that is, if the counted number of frames fed since the selection of the terminal T1 by the switch 57 at the step S13 has reached 3, on the other hand, then the flow of the operation goes on to a step S17 to perform a judgment as to whether or not the conversion signal $s_2$ is abnormal. If the outcome of the judgment performed at the step S17 indicates that the conversion signal $s_2$ is abnormal, then the flow of the operation returns to the step S1. If the outcome of the judgment performed at the step S17 indicates that the conversion signal $s_2$ is not abnormal, on the other hand, then the flow of the operation proceeds to a step S18 at which the control circuit 55 drives the switch 57 to select the terminal T2. As a result, in this case, only the conversion signal $s_2$ is used as a basis for correcting the optical axis.

Then, the flow of the operation continues to a step S19 at which the control circuit 55 waits for the cinematographic film 1 to move by a distance corresponding to a frame and performs a judgment as to whether or not the cinematographic film 1 has been intermittently fed further in the backward direction. If the determination at the step S19 is negative, that is, the film has been fed in the forward direction, then the flow of the operation returns to the step S1. If the outcome of the judgment performed at the step S19 indicates that the cinematographic film 1 has been intermittently fed in the backward direction, on the other hand, then the flow of the operation proceeds to a step S20 to perform a judgment as to whether or not the counted number of frames fed since the selection of the terminal T2 by the switch 57 at the step S18 is equal to or smaller than 3. If the outcome of the judgment performed at the step S20 indicates that the counted number of frames fed since the selection of the terminal T2 by the switch 57 at the step S18 is equal to or smaller than 3, then the flow of the operation returns to the step S17. That is to say, if the frames have been fed continuously in the backward direction since the selection of the terminal T2 by the switch 57 at the step S18, the counted number of frames fed since the selection of the terminal T2 by the switch 57 at the step S18 is equal to or smaller than 3, and the conversion signal $s_2$ is not abnormal, then only the conversion signal $s_2$ is used as a basis for correcting the optical axis.

If the outcome of the judgment performed at the step S20 indicates that the counted number of frames fed since the selection of the terminal T2 by the switch 57 at the step S18 is neither equal to nor smaller than 3, that is, if the counted number of frames fed since the selection of the terminal T2 by the switch 57 at the step S18 has reached 4, then the flow of the operation returns to the step S1.

As described above, the control circuit 55 performs a judgment as to whether the conversion signal $s_1$ or $s_2$ is normal or abnormal and further drives the switch 57 to select either of the conversion signal $s_1$ or $s_2$ or the average value of the conversion signals $s_1$ and $s_2$ for use as a base in the correction of the optical axis by taking the direction of the intermittent movement of the cinematographic film 1 and the number of frames fed during the movement into consideration. As a result, the optical axis can be corrected with a high degree of accuracy not only during the intermittent movement of the cinematographic film 1 in the forward and backward directions, but also at switching of the direction of the intermittent movement of the cinematographic film 1 with a joint of the film 1 placed between the sensors 11 and 12 by chance.

It should be noted that, if the outcome of the judgment performed at the initial step S1 of the flowchart shown in FIG. 9 indicates that both the conversion signals $s_1$ and $s_2$ are abnormal, that is, if the outcome of the judgment indicates, for example, the existence of 2 or more joints of the cinematographic film 1 not separated away from each other by a sufficiently long distance, a large deformation of the film surface around a joint due to an injury, or the existence of other kinds of abnormalities sandwiched by the fixed side picture gate 6 and the movable side picture gate 7 of the gate unit 5, then the flow of the operation goes on to a step S21 at which the control circuit 55 drives the switch 57 to select the terminal T4 before returning to the step S1 to wait for a next frame to be fed.

No signal is supplied to the terminal T4 but, in this case, electric charge has been accumulated in the capacitor 59 employed in the film position detecting circuit 13 shown in FIG. 5 in the immediately previous correction of the optical axis to generate a voltage representing a signal output through the switch 57. This voltage is supplied to the non-inverting input terminal of the operational amplifier 60. Thus, when both the conversion signals $s_1$ and $s_2$ are found abnormal, the correction of the optical axis is again based on a signal representing the position of the cinematographic film 1 used in the immediately previous correction.

It should be noted that the above processing to correct the optical axis which is based on a signal representing the position of the cinematographic film 1 in the longitudinal direction is carried out independently of processing to correct the optical axis based on a signal representing the position of the film 1 in the transversal direction. Note also that film joint detecting and compensating circuitry similar to that described above can be used in conjunction with the circuitry for correcting the optical axis based on a signal representing the position of the film 1 in the transversal direction.

Figure 10A:
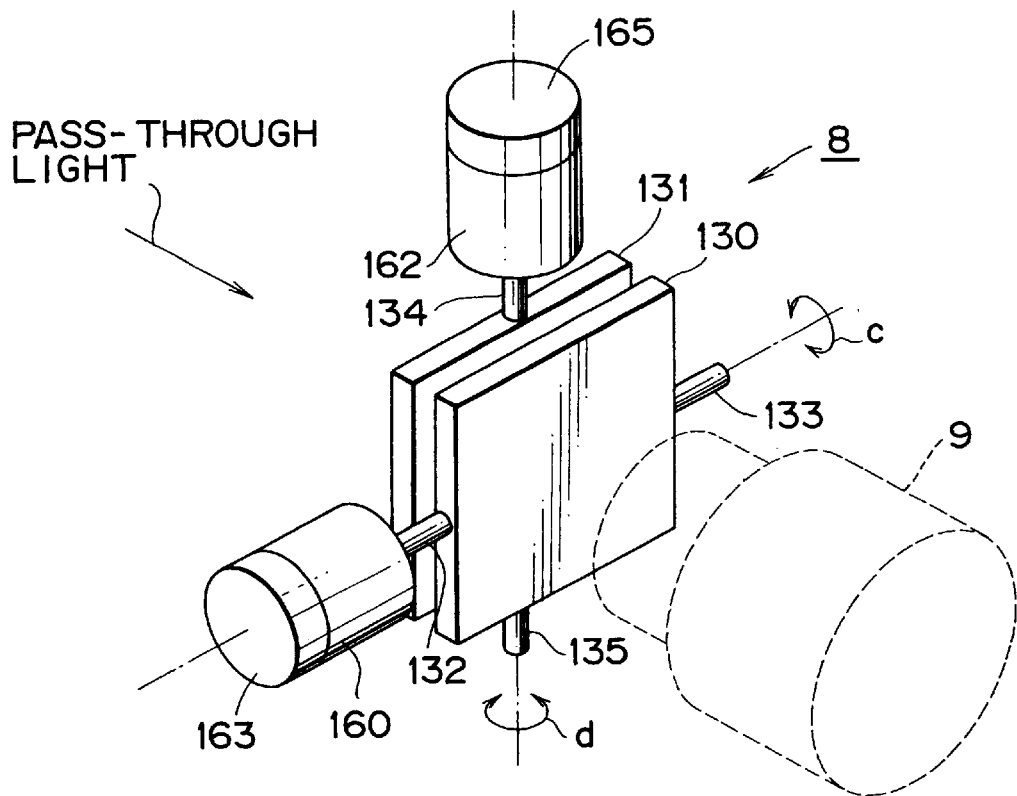
FIGS. 10(A) and 10(B) are diagrams of a typical configuration of an optical axis correcting unit 8 employed in the telecinematographic apparatus shown in FIG. 1.
Figure 10B:
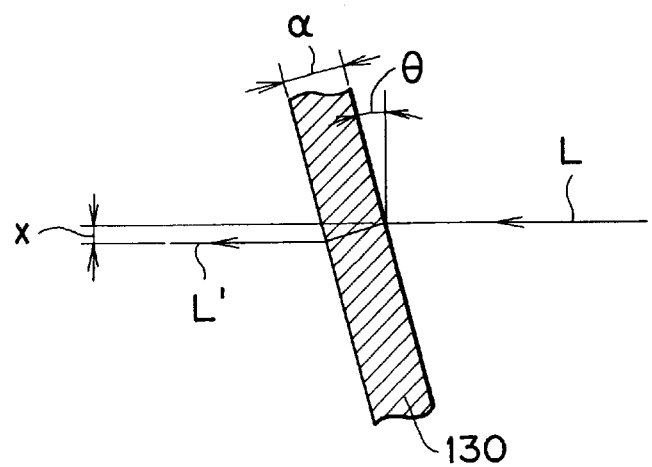
Figures 11A, 11B:
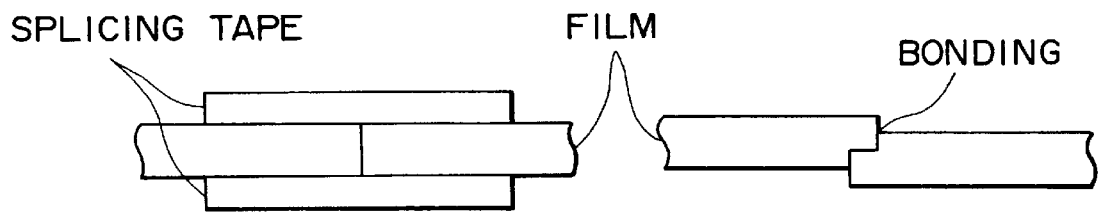
FIGS. 11(A) and 11(B) are diagrams used for explaining how cinematographic films are conventionally joined with each other.

FIGS. 10(A) and 10(B) are diagrams showing a typical configuration of the optical axis correcting unit 8 employed in the telecinematographic apparatus shown in FIG. 1. To be more specific, FIG. 10(A) is a diagram showing a perspective view of the optical axis correcting unit 8 whereas FIG. 10(B) is a diagram showing a cross section, that is, a plane surface passing through the rotational axis of a motor 162 shown in FIG. 10(A) perpendicularly to a plane plate 130 shown in FIG. 10(A). It should be noted that the rotational axis itself is not shown explicitly in FIG. 10(A).

Typically made of glass substances having the same index of refraction, the plane plate 130 and a plane plate 131 are stacked on each other and positioned in an orientation nearly perpendicular to the optical axis of the pass-through light coming from the gate unit 5. It should be noted that, in this arrangement, the plane plates 130 and 131 are located on a side exposed to the CCD camera 9 and a side exposed to the gate unit 5, respectively.

Shaft rods 132 and 133 are provided on both the right and left edges of the plane plate 130, forming a straight line with the rotational shaft of a motor 160 which is not shown explicitly in the figure. The plane plate 130 is rotated by the motor 160 in a rotational direction indicated by an arrow c shown in FIG. 10(A) with the shaft rods 132 and 133 taken as a rotational shaft.

By the same token, shaft rods 134 and 135 are provided on both the upper and lower edges of the plane plate 131, forming a straight line with the rotational shaft of the motor 162. The plane plate 131 is rotated by the motor 162 in a rotational direction indicated by an arrow d shown in FIG. 10(A) with the shaft rods 134 and 135 taken as a rotational shaft.

The rotational shafts of the motors 160 and 162 are oriented in directions perpendicular to each other and the directions are both perpendicular to the pass-through light. In addition, the motors 160 and 162 are provided with angle sensors 163 and 165 respectively. The angle sensors 163 and 165 are used for detecting the rotational angles of the motors 160 and 162 respectively, allowing the amount of correction of the optical axis of the pass-through light to be detected.

In the optical axis correcting unit 8 with the configuration described above, a signal output by the correction controlling circuit 14, that is, a signal representing the position of the cinematographic film 1 with the gain thereof adjusted, is supplied to the motors 160 and 162 which in turn rotate the plane plates 130 and 131, respectively, correcting the optical axis of the pass through light.

To put it in detail, as shown in FIG. 10(B), with the plane plate 130 oriented in a direction perpendicular to the optical axis L of the pass-through light coming from the gate unit 5, the optical axis L and the optical axis L' of a light passing through the plane plate 130 form a straight line. As shaft 132 of the motor 160 is rotated to incline the plane plate 130 from a direction perpendicular to the optical axis L by an angle $\ominus$ as shown in FIG. 10(B), the optical axis L' of the light passing through the plane plate 130 is shifted with the orientation thereof remaining parallel to the optical axis L by a distance x from the optical axis L over a plane surface which is perpendicular to the plane plate 130 and includes the optical axis L.

Assume that the thickness of the plane plate 130 is d and the index of refraction thereof is n. In this case, the angle θ and the distance x satisfy Eq. (6) as follows:

$$x = (d(\tan\theta - d(\tan(\sin^{-1}(\sin\theta/n)))) \times \tan(\pi/2 - \theta) \quad (6)$$

The above equation indicates that, in the case of sufficiently small angles θ, the distance x is proportional to the angle θ.

By the same token, as the shaft 134 of the motor 161 is rotated to incline the plane plate 131 from a direction perpendicular to the optical axis L by a rotational angle, the optical axis L' of the light passing through the plane plate 131 is shifted with the orientation thereof remaining parallel to the optical axis L by a distance proportional to the rotational angle from the optical axis L over a plane surface which is perpendicular to the plane plate 131 and includes the optical axis L.

In this way, the optical axis L' can be shifted in two directions perpendicular to each other in accordance with a signal representing the position of the cinematographic film 1. As a result, even if the cinematographic film 1 is halted at a position shifted from the natural position at which the film 1 is supposed to be halted, the positional shift can be compensated for so that no picture blurring is generated.

It should be noted that this method and apparatus and other methods and apparatus for correcting the optical axis to avoid picture blurring are described in detail in documents such as U.S. Pat. No. 5,608,474, issued Mar. 4, 1997, to the inventor of the present invention, and which is incorporated herein by reference. In particular, the present invention is not limited to the parallel plane plates 130, 131 but can also utilize convex and concave lenses which each also have plane surfaces, a prism formed by filling liquid into a gap between two platform materials, or an acousto-optic device which changes periodically. The refractive index of an acoustic-optic medium via a piezoelectric oscillator, all as disclosed in U.S. Pat. No. 5,608,474.

Since the correction of a positional shift is based on a signal output by the sensor 11 or 12 that is judged to be not abnormal as a result of detection of the position of the cinematographic film 1 as described above, the position of the film 1 including even the position of a joint of the film 1 and the position of a sprocket hole 10 created at a portion on the film 1 can be detected with a high degree of accuracy. As a result, blurring of the image can always be corrected with a very high degree of precision.

In addition, if the signals output by the sensor 11 or 12 are both judged to be not abnormal as a result of detection of the position of the cinematographic film 1, the correction of a positional shift is based on the average value of the signals. For this reason, blurring of the image can be compensated for with an even higher degree of precision.

As a result, it is also possible to enhance the stability of the position of a projected image and to improve the picture quality of the image.

As described above, the present invention is applied to a telecinematographic apparatus, but it is not limited to such an apparatus. The description given so far is not intended to be construed in a limiting sense. For instance, the present invention can also be applied to all apparatuses wherein the position of a film needs to be determined. Examples of such apparatuses include a recording apparatus for recording an image onto a cinematographic film and a projector for projecting an image recorded on a cinematographic film in addition to the telecinematographic apparatus described above.

Also as described above, in the present embodiment, the cinematographic film 1 is fed intermittently. It is worth noting, however, that the present invention can also be applied to a case in which the cinematographic film 1 is fed continuously.

In addition, while picture blurring is compensated for optically by means of the optical axis correcting unit 8 in the present embodiment, the method for compensating for picture blurring is not limited to what is adopted in the present embodiment. For example, picture blurring can be compensated for electrically by applying signal processing to the output of the CCD camera 9.

Furthermore, while the position of the cinematographic film 1 is detected by adopting the electrostatic capacity technique in the present embodiment, the method for detecting the position of the film 1 is not limited to what is adopted in the present embodiment. For example, the position of the cinematographic film 1 can be detected by means of devices such as a photo sensor.

Furthermore, in the present embodiment, two sensors, that is, the sensors 11 and 12, are provided as sensors used for sensing the position of the cinematographic film 1. It should be noted, however, that the description given so far is not intended to be construed in a limiting sense. That is to say, the scope of the present invention is not limited to the two sensors. For example, three or more such sensors can be provided. Moreover, the sensors 11 and 12 are installed at positions on the upstream and downstream sides respectively of the movement of the cinematographic film 1 with respect to the projection area 31 or the opening 7A. It is worth noting, however, that the locations at which the sensors 11 and 12 are installed are not limited to such positions. For example, one of a plurality of sensors can be provided at the projection area 31 while the remaining sensors are installed at locations other than the gate unit 5.

It is desirable, however, to install a plurality of sensors at such locations that a joint of the cinematographic film 1 does not become an object of simultaneous positional detection by the sensors. To be more specific, it is desirable to install a plurality of sensors at locations separated away from each other by distances to some extent. In addition, it is also desirable to install a plurality of sensors at such locations that, before the cinematographic film 1 is halted during an intermittent feeding operation, no joint of the film 1 comes near any of the sensors. Furthermore, it is also desirable to install a plurality of sensors at locations in close proximity to the projection area 31 or the opening 7A due to the fact that it is the misalignment of the film at the position at which a film is to be projected which gives rise to a picture blurring problem.

According to the film processing apparatus and method described above, a plurality of film position detecting means are provided at different locations for detecting the position of a film; and a position shift correcting means is used for compensating for a positional shift of a film on the basis of one or more signals output by the film position detecting means. As a result, blurring of a picture typically resulting from projection of an image recorded on a film can always be compensated for with a very high degree of accuracy. In particular, a plurality of film position detecting means (sensors 11, 12) are provided at different locations, each for detecting the position of the film relative to a predetermined position and outputting position detection signals. An abnormality judging means (film joint detecting circuits 53, 54), supplied with the position detection signals, determines whether or not the position detection signals are abnormal and outputs an abnormality detection signal for each of the position detection signals which is determined to be abnormal. A positional shift correcting means (control circuit 55, switches 57, 58, capacitor 59, operational amplifier 60, plates 130, 131, motors 160, 162, shafts 132, 134, and angle sensors 163, 165) supplied with the position detection signals and the abnormality detection signals corrects for a positional shift of the film on the basis of the position detection signals which are judged by the abnormality judging means to be not abnormal. Note that, as mentioned above, the positional shift correcting means is not generally limited to an optical axis correcting device (i.e. plates 130, 131, motors 160, 162, shafts 132, 134, and angle sensors 163, 165 could be replaced by other mechanisms to correct for film shift). A film guiding means (film guide 5) guides the film and an opening (opening 7A) for passing through a light is created on the film guiding means. The film position detecting means are provided on the film guiding means.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A film processing apparatus for processing a film comprising:

a plurality of film position detecting means provided at different locations each for detecting the position of the film relative to a predetermined position and outputting position detection signals;

an abnormality judging means supplied with the position detection signals for determining whether or not the position detection signals are abnormal and outputting an abnormality detection signal for each of the position detection signals which is determined to be abnormal; and a positional shift correcting means supplied with the position detection signals and the abnormality detection signals for correcting for a positional shift of the film on the basis of the position detection signals which are judged by the abnormality judging means to be not abnormal.

2. A film processing apparatus according to claim 1 wherein the positional shift correcting means optically corrects for the positional shift of the film.

3. A film processing apparatus according to claim 1 wherein the film position detecting means are installed at locations sufficiently spaced apart from each other that any joint existing in the film does not become an object of simultaneous positional detection by all the film position detecting means.

4. A film processing apparatus according to claim 1 further comprising:

a film guiding means for guiding the film wherein an opening for passing through a light is created on the film guiding means; and the film position detecting means are provided on the film guiding means.

5. A film processing apparatus according to claim 4 wherein the film position detecting means are provided at least on the upstream and downstream sides of a traveling path of the film with respect to the opening created on the film guiding means.

6. A film processing apparatus according to claim 1, wherein the positional shift correcting means comprises:

control means supplied with the position detection signals and the abnormality detection signals for generating a positional shift correction signal on the basis of the position detection signals which are judged by the abnormality judging means to be not abnormal; and correcting means supplied with the positional shift correction signal for correcting the positional shift of the film in accordance with the positional shift correcting signals.

7. A film processing apparatus according to claim 6 wherein the correcting means optically corrects for the positional shift of the film.

8. A film processing apparatus according to claim 6, wherein the film position detecting means comprises at least a first sensor for generating a first position detection signal and a second sensor for generating a second position detection signal and the control means comprises a control circuit supplied with the abnormality detection signals, a value averaging circuit supplied with the first position detection signal and the second position detection signal for outputting an average position detection signal, and a switch controlled by the control circuit for selecting and outputting one of the first position detection signal, the second position detection signal, and the average position detection signal as the positional shift correction signal, wherein the control circuit causes the switch to output the first position detection signal when the abnormality judging means determines that the first position detection signal is not abnormal but the second position detection signal is abnormal; the second position detection signal when the abnormality judging means determines that the first position detection signal is abnormal but the second position detection signal is not abnormal, or the average position detection signal when the abnormality judging means determines that neither the first position detection signal nor the second position detection signal is abnormal.

9. A film processing apparatus according to claim 8, wherein the film position detecting means further comprises a sample and hold circuit controlled by the control circuit and the control circuit causes the sample and hold circuit to output the positional shift correction signal existing immediately prior to a determination by the abnormality judging means that both the first position detection signal and the second position detection signal are abnormal.

10. A film processing method for processing a film comprising the steps of:

detecting, at different locations, the position of the film relative to a predetermined position and outputting position detection signals corresponding to each location;

determining whether or not the position detection signals are abnormal and outputting an abnormality detection signal for each of the position detection signals which is determined to be abnormal; and correcting for a positional shift of the film on the basis of the position detection signals which are judged by the abnormality judging step to be not abnormal.

11. A film processing method according to claim 10 wherein the step of correcting for a positional shift of the film comprises the step of correcting the optical axis-of light transmitted through the film.

12. A film processing method according to claim 10 wherein, when all the position detection signals are judged by the abnormality determining step to be abnormal, the positional shift correcting step corrects a positional shift of the film on the basis of the results of position detection signals output by the film position detecting step which have been used in an immediately previous correction.

13. A film processing method according to claim 10 wherein film position detecting steps are simultaneously performed at locations spaced apart along the length of the film so that any joint existing on the film does not become an object of simultaneous positional detection by all of the film position detecting steps.

14. A film processing method according to claim 10 further comprising the steps of:

guiding the film over an opening for passing through a light; and performing the film position detecting step adjacent to the opening.

15. A film processing method according to claim 10 wherein the film position detecting step is performed at least on the upstream and downstream sides of a traveling path of the film with respect to the opening.

16. A movie film image projecting device wherein a movie film is intermittently stopped in a manner synchronized with rotation of a sprocket by means of travel-synchronizing holes which have been formed longitudinally with respect to the movie film and a light from a light source is projected on a stated region of the movie film at a stopped base position, the image projecting device comprising:

detectors for detecting at a plurality of locations the displacement of the film from the base position at the time the movie film has stopped, on the basis of the travel-synchronizing holes, and outputting a different position detection signal corresponding to the deviation of the film from the base position at each of the plurality of locations;

an abnormality judging circuit supplied with the position detection signals for determining whether or not the position detection signals are abnormal and outputting an abnormality detection signal for each of the position detection signals which is determined to be abnormal; and an optical axis correcting unit supplied with the position detection signals and the abnormality detection signals for correcting the optical axis of light transmitted through the movie film on the basis of the position detection signals which are judged by the abnormality judging means to be not abnormal.

* * * * *